United States Patent
Brunson, IV et al.

(10) Patent No.: US 10,506,653 B1
(45) Date of Patent: Dec. 10, 2019

(54) SELECTION AND USE OF DIFFERENT WIRELESS NETWORKS BY METER READING DEVICES

(71) Applicant: Neptune Technology Group Inc., Tallassee, AL (US)

(72) Inventors: Charles P. Brunson, IV, Auburn, AL (US); Gloice Dean Works, III, Auburn, AL (US); Robert Dale Reed, Prattville, AL (US)

(73) Assignee: NEPTUNE TECHNOLOGY GROUP INC., Tallassee, AL (US)

( * ) Notice: Subject to any disclaimer, the term of this patent is extended or adjusted under 35 U.S.C. 154(b) by 0 days.

(21) Appl. No.: 15/992,629

(22) Filed: May 30, 2018

(51) Int. Cl.
*H04W 76/15* (2018.01)
*G01D 4/00* (2006.01)
*H04W 84/18* (2009.01)

(52) U.S. Cl.
CPC .......... *H04W 76/15* (2018.02); *G01D 4/002* (2013.01); *H04W 84/18* (2013.01)

(58) Field of Classification Search
CPC ....... H04W 76/15; H04W 84/18; G01D 4/002
See application file for complete search history.

(56) References Cited

U.S. PATENT DOCUMENTS

| | | | |
|---|---|---|---|
| 4,136,563 A * | 1/1979 | Mueller | G01F 1/704 73/861.03 |
| 6,246,677 B1 | 6/2001 | Nap et al. | |
| 6,373,399 B1 | 4/2002 | Johnson et al. | |
| 6,538,577 B1 | 3/2003 | Ehrke et al. | |
| 7,046,682 B2 | 5/2006 | Carpenter et al. | |
| 7,277,027 B2 | 10/2007 | Ehrke et al. | |
| 7,283,062 B2 | 10/2007 | Hoiness et al. | |
| 7,336,200 B2 | 2/2008 | Osterloh et al. | |
| 7,400,904 B2 | 7/2008 | Cornwall et al. | |
| 7,479,895 B2 | 1/2009 | Osterloh et al. | |
| 7,505,453 B2 | 3/2009 | Carpenter et al. | |
| 7,535,378 B2 | 5/2009 | Cornwall | |
| 7,868,782 B2 | 1/2011 | Ehrke et al. | |
| 7,986,718 B2 | 7/2011 | Monier | |
| 7,994,935 B2 | 8/2011 | Salser, Jr. et al. | |
| 8,031,650 B2 | 10/2011 | Petite et al. | |
| 8,217,804 B2 | 7/2012 | Laughlin-Parker et al. | |

(Continued)

FOREIGN PATENT DOCUMENTS

CA 2264796 A1 3/1998
CA 272 3665 A1 6/2011

*Primary Examiner* — Amine Benlagsir
(74) *Attorney, Agent, or Firm* — Snyder, Clark, Lesch & Chung, LLP

(57) ABSTRACT

A method, a device, and a non-transitory storage medium are described in which a meter interface device may attempt to join a third party wireless network, in addition to a mobile transceiver network, in response to a power-up procedure or a reset procedure. Additionally, the meter interface device may simultaneously operate in multiple modes of communications. The meter interface device may select the third party wireless network based on preference information and back-off information. The meter interface device may wait a back-off period, after an unsuccessful attempt to join the third party wireless network, before re-attempting to join the third party wireless network. The meter interface device may also attach to one or multiple other networks including a fixed network.

20 Claims, 16 Drawing Sheets

(56) References Cited

U.S. PATENT DOCUMENTS

| | | |
|---|---|---|
| 8,378,846 B2 | 2/2013 | Olson et al. |
| 8,379,564 B2 | 2/2013 | Petite et al. |
| 8,390,472 B2 | 3/2013 | Cornwall |
| 8,516,096 B2 | 8/2013 | LeBlanc et al. |
| 8,988,249 B2 | 3/2015 | Chevrette et al. |
| 9,173,160 B2 | 10/2015 | LeBlanc et al. |
| 9,279,698 B2 | 3/2016 | Hechtfischer et al. |
| 9,456,258 B2 | 9/2016 | Mani et al. |
| 9,538,388 B2 | 1/2017 | McHenry et al. |
| 2005/0195775 A1 | 9/2005 | Petite et al. |
| 2005/0237959 A1* | 10/2005 | Osterloh ............... H04Q 9/00 370/310 |
| 2008/0136667 A1 | 6/2008 | Vaswani et al. |
| 2010/0007521 A1 | 1/2010 | Cornwall |
| 2013/0077610 A1* | 3/2013 | Amini ............... H04W 52/0216 370/338 |
| 2013/0096954 A1* | 4/2013 | Bodas ................... G06Q 40/08 705/4 |
| 2014/0028465 A1 | 1/2014 | Cornwall |
| 2014/0125494 A1 | 5/2014 | Hechtfischer et al. |
| 2014/0247140 A1 | 9/2014 | Proud |
| 2014/0320306 A1 | 10/2014 | Winter |
| 2015/0143456 A1* | 5/2015 | Raleigh ............... H04W 12/08 726/1 |
| 2016/0021433 A1* | 1/2016 | Mani ..................... G01D 4/02 340/870.07 |
| 2016/0150298 A1 | 5/2016 | Kim |
| 2017/0041026 A1* | 2/2017 | Hassan ............. H03M 13/2792 |
| 2017/0251393 A1* | 8/2017 | Cui .................... H04W 28/021 |

\* cited by examiner

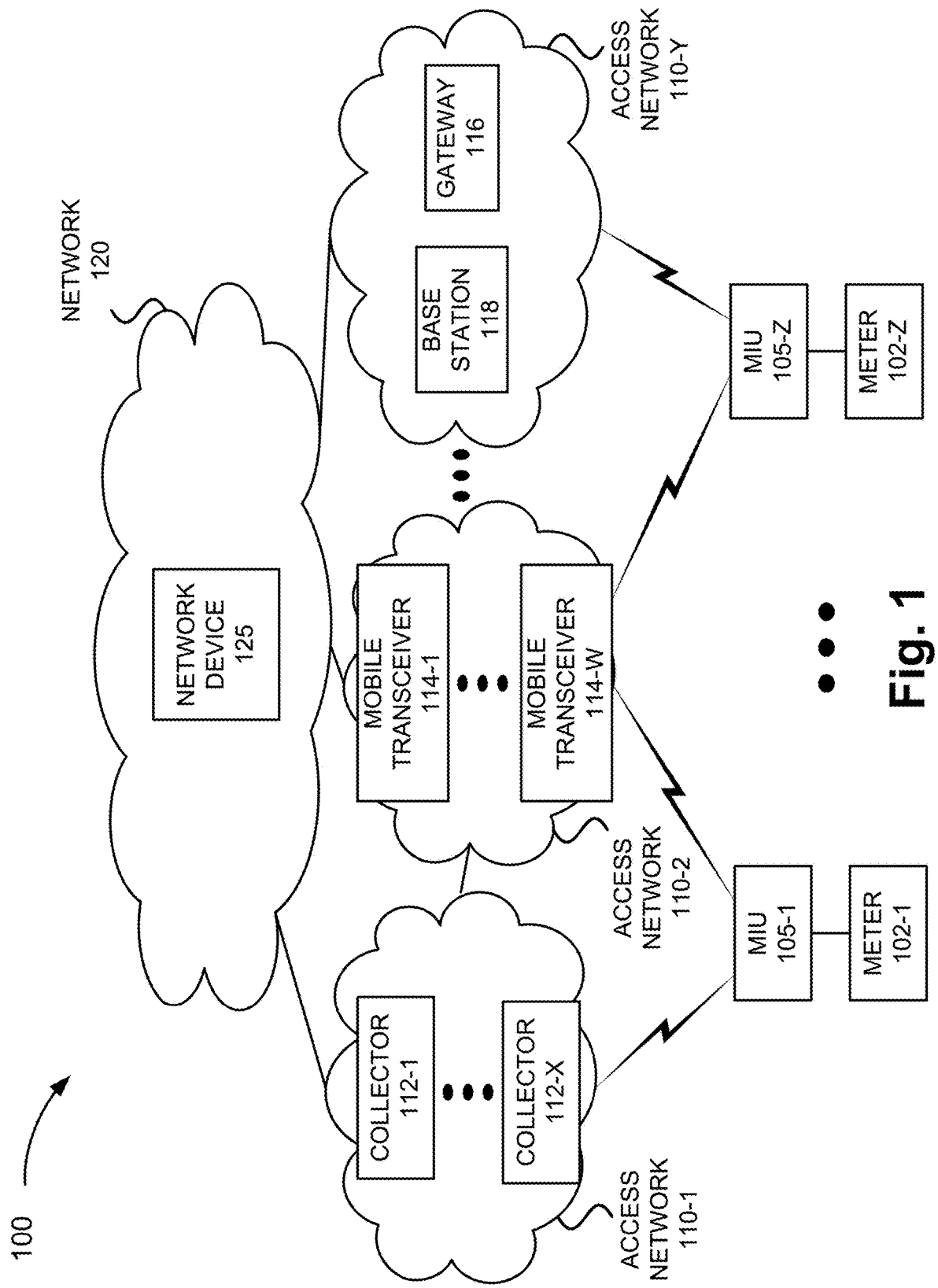

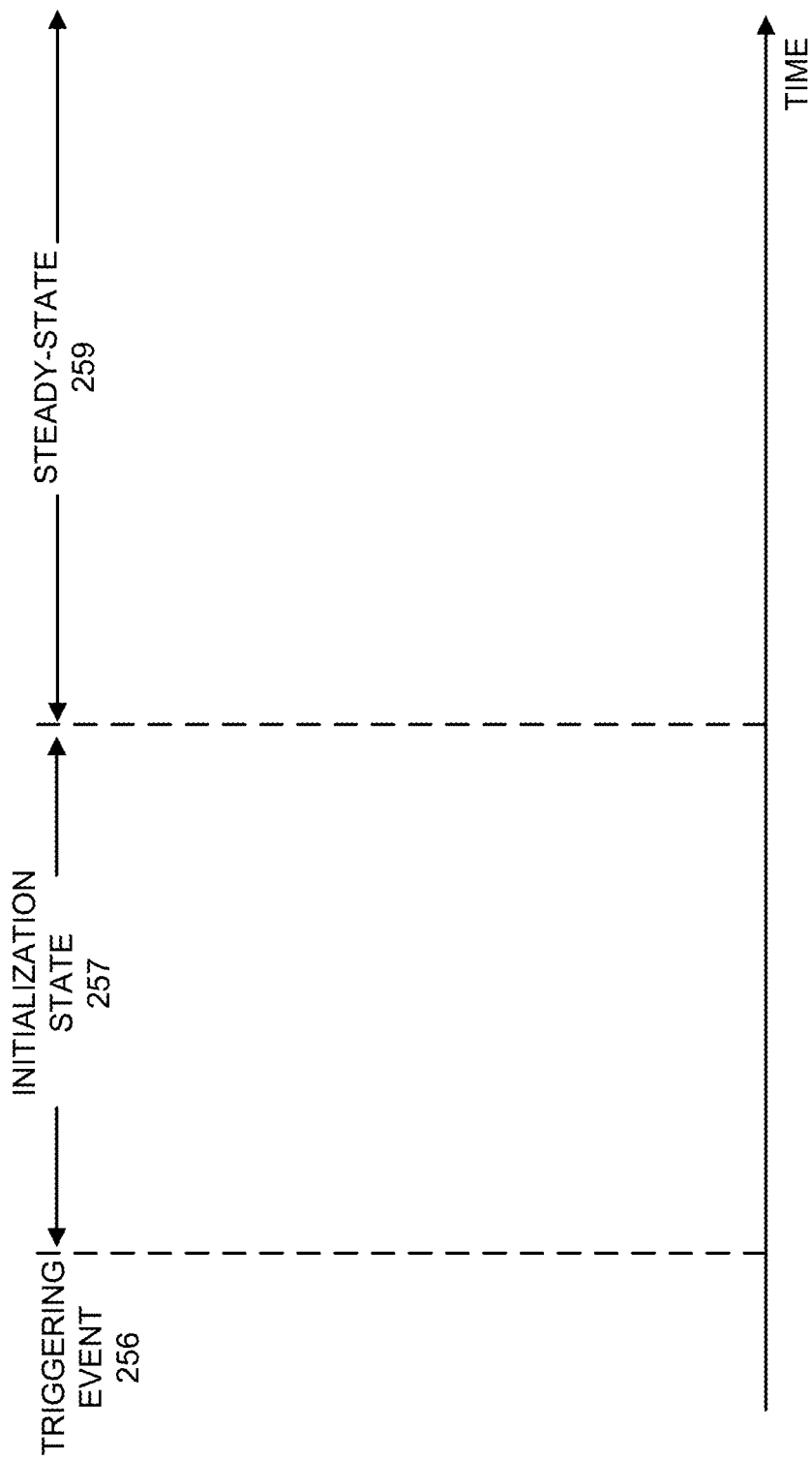

SELECTION AND USE OF DIFFERENT WIRELESS NETWORKS BY METER READING DEVICES

BACKGROUND

Utilities and other entities operate distribution systems for various resources (e.g., water, gas, electricity, chemicals, etc.) to deliver these resources to customers connected to the distribution systems. A meter may be used at each point the resource is removed and/or provided from the distribution system to a customer to measure usage. Many metering systems use wireless communications to report meter readings to a backend system via a communication network.

BRIEF DESCRIPTION OF THE DRAWINGS

FIG. 1 is a diagram illustrating an exemplary environment in which an exemplary embodiment of a network selection service may be implemented;

FIG. 2C is a diagram illustrating exemplary operational states of the MIU;

DETAILED DESCRIPTION OF PREFERRED EMBODIMENTS

Figure 2A:
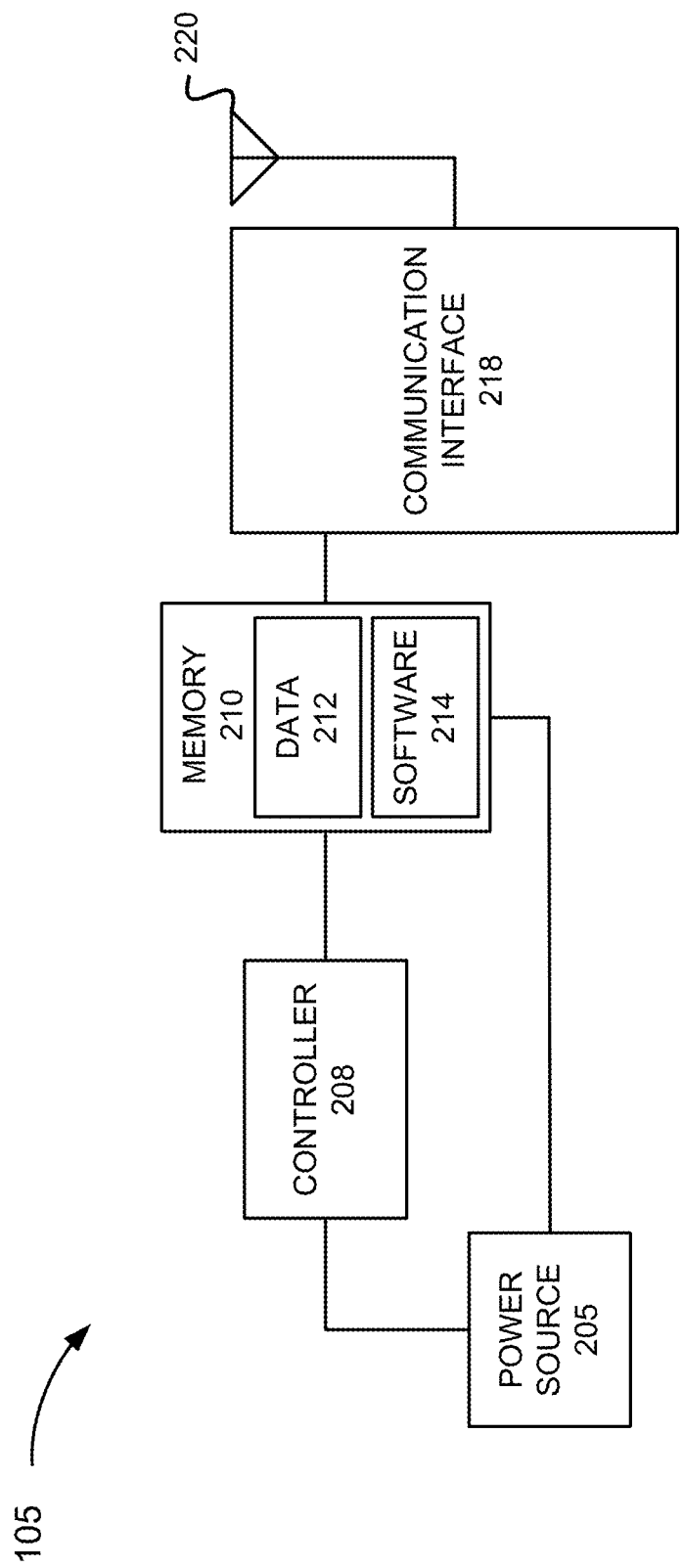
FIG. 2A is a diagram illustrating exemplary components of an exemplary embodiment of a meter interface unit (MIU) depicted in FIG. 1.

The following detailed description refers to the accompanying drawings. The same reference numbers in different drawings may identify the same or similar elements. Also, the following detailed description does not limit the invention.

Meters that measure usage of a resource, such as a utility (e.g., water, gas, electricity, etc.) or another type of resource (e.g., chemical, etc.) are widely used. Further, meters have been combined with electronic components to facilitate communication between the meters and backend systems via a network. For example, a meter interface unit (MIU) may include a transmitter that is configured to wirelessly transmit usage information and other information (e.g., leak information, reverse flow detection, etc.). The MIU may also include a receiver that is configured to wirelessly receive information and commands. The meter and the MIU may be a part of an automated meter reading (AMR) system.

The MIU may use one or multiple networks for communication. For example, the MIU may transmit information to a mobile transceiver of a wireless network. The mobile transceiver may be implemented as a handheld device, which may be operated by a user (e.g., an employee of a utility company). Alternatively, for example, the mobile transceiver may be implemented as a vehicle mount to a utility vehicle. Additionally, or alternatively, the MIU may communicate with a network device of a fixed network or a proprietary network of an entity (e.g., a utility company). For example, the network device (e.g., often referred to as "gateway" or a "collector") may be physically situated in proximity to the MIU. The MIU may be configured with various parameters that govern how the communication is performed relative to the type of network (e.g., fixed, mobile, etc.). For example, depending on the mode of communication (e.g., fixed network, mobile transceiver network, etc.), the MIU may transmit at different power levels, data rates, time periods, using different modulation schemes, and so forth. The mobile transceiver and the network device may be managed by the entity (e.g., a utility company) of the AMR system.

Despite the use of mobile transceivers and fixed/proprietary networks, there may or may not be other available wireless networks for the MIU to access and use for communication. For example, there may or may not be a third party wireless network, such as a Long Range wide area network (LoRaWAN), a Sigfox low-power WAN (LPWAN), an Ingenu machine network, and/or another type of wireless network that may be wirelessly accessible for communication. However, this access and use of another wireless network may be problematic. For example, the MIU may not be configured to access and use the other wireless network because at the time of installation of the MIU, the wireless network did not exist. According to another example, the wireless network may have existed at the time of installation, but a business relationship between an entity (e.g., a utility company) managing the MIU, the network operator or service provider of the wireless network, and other parties (e.g., customers of the utility company, etc.) have not been formed to permit such access and use. According to still other examples, various issues to configure the MIU may arise stemming from different carriers of the same type of wireless network, from different carriers of different types of wireless networks, and so forth.

Consequently, an entity may have to manufacture and install different versions of MIUs. Such an approach, however, may be cost prohibitive to the entity. Additionally, or alternatively, an entity may have to reconfigure installed MIUs every time network coverage changes in a given geographic location. Unfortunately, reconfiguration of MIUs necessarily entails usage of various resources (e.g., network, MIU, etc.). Additionally, a reconfiguration process may be subject to errors occurring, intervention by personnel and/or customers, and further usage of various resources when errors do occur. Also, the selection and use of a network may significantly impact efficient use of resources of an MIU, effective and efficient communication of data to and/or from the MIU, and efficient use of resources of the wireless network.

According to exemplary embodiments, a network selection service is described. According to an exemplary embodiment, an MIU includes a component that provides the network selection service, as described herein. According to an exemplary embodiment, the MIU supports access and use of multiple types of wireless networks. For example, according to an exemplary implementation, the MIU supports access to and use of a mobile transceiver network, a fixed/proprietary network, and one or multiple third party wireless networks. According to other exemplary implementations, the MIU may support additional, different, and/or fewer wireless networks.

According to an exemplary embodiment, the network selection service may be invoked in response to various triggering events. For example, the network selection service may be invoked in response to various operational procedures (e.g., power up, reset, or soft/hard reboot) of the MIU. The operational procedure may be triggered by various input means, such as a user pressing a mechanical switch on the MIU or swiping a magnet across a sensor of the MIU. Alternatively, the operational procedure may be triggered by the MIU receiving a command (e.g., a reset command, a reboot command, etc.) from a network device or from another configurable input. As a part of an initialization process performed by the MIU, the MIU may attempt to connect to one or multiple wireless networks in which the network selection service may be invoked. Additionally, for example, the network selection service may be invoked based on other events that may not involve a power up, a reset, or reboot. For example, the MIU may invoke the network selection service in response to receiving various types of commands from the network (e.g., a credential-update command, a switch network carrier command, or another type of network command) while the MIU is operating in a post-initialization state (also referred to as "steady-state").

According to an exemplary embodiment, the MIU is configured for access to and use of a wireless network before the wireless network may even exist in a geographic location at which the MIU is installed, or before permission to access and use the wireless network (e.g., from a business relationship standpoint) is granted. For example, the MIU may be configured to access and use a LoRaWAN, an LPWAN, a machine network, and/or another type of wireless network that is not present at the time of installation of the MIU or before permission to access and use the wireless network is permitted. In this way, a change in network coverage may not require a new MIU and/or reconfiguration of an already installed MIU. According to other exemplary embodiments, the MIU is configured for access and use of a wireless network (e.g., other than a mobile transceiver network and a fixed/proprietary network) that was present at the time of installation. For example, the MIU may be configured to access and use a third party wireless network that was present and permission was granted prior to the time of installation of the MIU.

According to an exemplary embodiment, with respect to a third party wireless network, the MIU is configured to select and attempt to access and use the wireless network based on preference information. According to an exemplary implementation, the preference information indicates a preference of a third party wireless network and/or carrier over another third party wireless network and/or carrier. The preference information may be used by the network selection service to govern the selection and use of the wireless network. According to various exemplary implementations, the preference information may indicate a preference when the MIU is to operate in a simultaneous mode of communication (e.g., simultaneously communicating with two or more wireless networks) and/or when the MIU is to operate in a unitary mode of communication (e.g., communicating with a single wireless network). Additionally, for example, for the simultaneous mode of communication, the preference information may indicate a different preference depending on the wireless networks involved. For example, a preference when the MIU is to communicate via the mobile transceiver network and a third party wireless network may be different from a preference when the MIU is to communicate via the fixed/proprietary network and a third party wireless network.

According to an exemplary embodiment, the preference information may be configured to optimize and/or preserve resource utilization. For example, when the MIU is connected to a mobile transceiver network or communicating via the mobile transceiver network, during such time, the MIU may select and attempt to access and use a third party wireless network based on battery power considerations, data throughput considerations, and/or other MIU resource-based considerations.

According to an exemplary embodiment, when the attempt to access and use the third party wireless network is successful for the simultaneous mode of communication, the MIU may interleave transmissions of data to the mobile transceiver network or the fixed/proprietary network, and the third party wireless network. However, when the attempt to access and use the third party wireless network is not successful, the network selection service is configured to implement a back-off period. The back-off period may configure the MIU as to when a next attempt to select and access the wireless network is permitted. The back-off period may be calculated based on various criteria including, for example, whether the MIU has ever accessed and used the third party wireless network, as described herein. In this regard, a back-off period for a third party wireless network that the MIU has never previously accessed and used may be different from the back-off period for a wireless network that the MIU has previously accessed and used.

According to another exemplary embodiment, the MIU may be configured to receive and interpret a command that notifies the MIU that a new wireless network is available for access and use. For example, according to an exemplary implementation, the MIU may receive a command via a fixed/proprietary network or a mobile transceiver network that indicates a third party wireless network is available. In this way, for a subsequent communication, the MIU may select and attempt to access and use the third party wireless network for a first time.

According to an exemplary embodiment, the MIU stores configuration data that allows the MIU to access a third party wireless network. For example, the configuration data may include network credentials and/or other setting information that allows access and use of the third party wireless network.

As a result, the network selection service may significantly improve resource utilization at the MIU and may improve communication of data to/from the MIU to/from various backend systems.

FIG. 1 is a diagram illustrating an exemplary environment 100 in which an exemplary embodiment of the network selection service may be implemented. As illustrated, environment 100 includes meters 102-1 through 102-Z, in which Z>1 (referred to collectively as meters 102 and individually (or generally) as meter 102) and MIUs 105-1 through 105-Z (referred to collectively as MIUs 105 and individually (or generally) as MIU 105). Environment 100 further includes access networks 110-1 through 110-Y, in which Y>1 (referred to collectively as access networks 110 and individually (or generally) as access network 110), and a network 120. According to other embodiments, environment 100 may include additional networks and/or different types of networks than those illustrated and described herein. The number, the type, and the arrangement of devices in access networks 110 and network 120 are exemplary. The number and the arrangement of meters 102 and MIUs 105 are exemplary. Environment 100 may include communication links between various network devices and networks, as well as between MIUs 105 and access networks 110. The number, the type, and the arrangement of communication links illustrated in environment 100 are exemplary.

Meter 102 may include a device that is configured to measure usage of a resource. For example, meter 102 may be implemented as a water meter or another type of meter, as previously described. Various implementations of meter 102 may use different measurement technologies (e.g., ultrasonic sensing, magnetic-driven, positive displacement, etc.) to measure usage of the particular resource, such as water, and so forth.

MIU 105 may include an electronic device that collects, analyzes, and stores data from meter 102. According to one exemplary implementation, MIU 105 may be integrated into meter 102. According to another exemplary implementation, MIU 105 (or portion thereof) may be a separate component from meter 102. For example, the separate component may be communicatively coupled to meter 102 (or a remaining portion of MIU 105) via a cable or another type of connector. According to an exemplary implementation, MIU 105 may include a wireless transmitter and a wireless receiver for communication. According to an exemplary embodiment, MIU 105 includes a component that provides the network selection service, as described herein. MIU 105 is described further below.

Access networks 110 may include multiple wireless networks that may support multiple wireless (e.g., radio) technologies. For example, access network 110-1 may include a fixed wireless network, as previously described, which includes collectors 112-1 through 112-X, in which X>1 (referred to collectively as collectors 112 and individually (or generally) as collector 112). Access network 110-1 may support an AMR system. Access network 110-1 may be a proprietary wireless network (e.g., owned and operated by a utility company (e.g., a water utility company, etc.)). Collector 112 may include a network device that is configured to receive, analyze, and store data from MIU 105, such as water usage information. Collector 112 may also transmit data to MIU 105 and may communicate with a backend system (e.g., network device 125 of network 120). Access network 110-1 may operate in a "one-way" communication mode, a "two-way" communication mode, or a combination of both in relation to MIU 105 and collector 112, as well in relation to collector 112 and the backend system.

Additionally, for example, access network 110-2 may include a mobile transceivers network, as previously described, which includes mobile transceivers 114-1 through 114-W (referred to collectively as mobile transceivers 114 and individually (or generally) as mobile transceiver 114). Access network 110-2 may support an AMR system. Mobile transceiver 114 may include a network device that is configured to receive and store data from MIU 105. As previously described, mobile transceiver 114 may be implemented as a mobile or handheld user device (e.g., operated by a user or a technician associated with a utility company, such as a water company), a vehicle mounted device, or another suitable mobile device (e.g., a drone, etc.). Mobile transceiver 114 may also be configured to communicate with the backend system. Mobile transceiver 114 may operate in one or multiple communication modes (e.g., one-way, two-way, etc.). According to some exemplary implementations, mobile transceiver 114 may also connect to MIU 105 via a wired connection. For example, a utility employee/technician may connect a mobile device (e.g., a tablet, a handheld device, etc.) to MIU 105 via a cable or other suitable connector.

Also, for example, access network 110-Y may include a wireless network. According to an exemplary embodiment, access network 110-Y is a third party wireless network. For example, the phrase "third party" may be relative to a utility company and its customers. Access network 110-Y may be implemented to include a LoRaWAN, an LPWAN, a machine network, and/or another type of wireless network, such as an Evolved UMTS Terrestrial Radio Access Network (E-UTRAN), a next generation RAN (e.g., a 5G-access network), a WiFi network, and/or a Worldwide Interoperability for Microwave Access (WiMAX) network. Depending on the implementation, access network 110-Y may include various types of wireless nodes, such as, for example, a base station 118, a gateway 116, as well as other types of wireless nodes not illustrated (e.g., evolved Node B (eNB), a next generation Node B (gNB), an evolved Long Term Evolution (eLTE) eNB, a small cell device, etc.).

Network 120 may include a network that provides access to and hosts network device 125. For example, network 120 may be implemented to include a WAN, the Internet, an Intranet, an Internet Protocol (IP) network, a wired network, a wireless network, and/or another suitable network. Network device 125 includes a device that may be configured to aggregate and process the data received from access networks 110 and MIUs 105. For example, network device 125 may be implemented to include a server device and a data management system. Additionally, for example, network device 125 may be maintained by a utility company or another entity associated with meters 102 and MIUs 105. Network device 125 may include a system that generates customer bills based on the processed meter usage data, such as the amount of water used over a period of time.

FIG. 2A is a diagram illustrating exemplary components of an exemplary embodiment of MIU 105. As illustrated, MIU 105 may include a power source 205, a controller 208, a memory 210, a communication interface 218, and an antenna 220. According to other embodiments, MIU 105 may include fewer components, additional components, different components, and/or a different arrangement of components than those illustrated in FIG. 2A and described herein. For example, although not illustrated, MIU 105 may include a meter interface. The meter interface may physically or wirelessly connect MIU 105 to meter 102 and allow MIU 105 to detect or receive meter usage data. Additionally, the connections between components depicted in FIG. 2A are exemplary. According to other exemplary embodiments, there may additional, fewer, and/or different connections between the components.

Power source 205 may include a battery or another suitable source for electrical current, such as a local power grid, a local generator (e.g., a photoelectric generator, etc.), and so forth.

Controller 208 may include a processor. For example, controller 208 may include a central processing unit (CPU) (e.g., one or multiple cores), a microprocessor, an application specific integrated circuit (ASIC), a programmable logic device, a system-on-chip (SoC), a microcontroller, and/or another type of component that interprets and/or executes instructions and data.

Memory 210 may include various types of memory. For example, memory 210 may include a random access memory (RAM), a dynamic random access memory (DRAM), a static random access memory (SRAM), a ferroelectric RAM, a cache, a read only memory (ROM), a programmable read only memory (PROM), an erasable PROM (EPROM), an electrically EPROM (EEPROM), a flash memory, and/or another type of memory.

As illustrated, memory 210 may store data 212 and software 214. Data 212 may include various type of information that support the operation of meter 102/MIU 105. For example, data 212 may include product information (e.g., an MIU identifier, a lot number, a manufacturer date, etc.), configuration information (e.g., network credentials, etc.), meter data pertaining to meter 102, data received from access network 110/network device 125, and so forth.

Software 214 includes an application, a program, or another form of instructions that provides a function and/or a process. As an example, software 214 may include instructions that, when executed by controller 208, provides the functions of the network selection service, as described herein. Additionally, as another example, software 214 may include instructions that, when executed by controller 208, provides an AMR service. Software 214 may also include firmware, middleware, microcode, hardware description language (HDL), and/or another form of instructions. Software 214 may further include an operating system (OS).

Communication interface 218 may include a transmitter and a receiver. Communication interface 218 may operate according to a protocol stack and a communication standard. Communication interface 218 may include various processing logic or circuitry that may provide a function (e.g., multiplexing/de-multiplexing, filtering, amplifying, digital/analog converting, error correcting, modulating/de-modulating, etc.). Antenna 220 may include an antenna that receives and transmits wireless signals. For example, antenna 220 may include a dipole antenna, a low-profile antenna, or another type of antenna that is capable of operating in a desired frequency band.

According to some exemplary embodiments, MIU 105 may be synchronized to a schedule based on a real-time clock (not illustrated) of MIU 105. The real-time clock may not be synchronized to a clock of any external device, but in some embodiments, a wireless network (e.g., via collector 112 or mobile transceiver 114) may periodically update or correct the time of MIU's 105 clock. At scheduled intervals, controller 208 may wake up and check a table (or another type of data structure) that identifies what actions are scheduled to occur at that time. Controller 208 may then cause a variety of actions to occur, such as, for example, interrogating meter 102 for its data, transmitting data, and so forth. MIU 105 may also perform operations that may be unscheduled, such as data transmissions relating to an alarm, performing an operation in response to receiving a command from a network, and so forth.

Figure 2B:
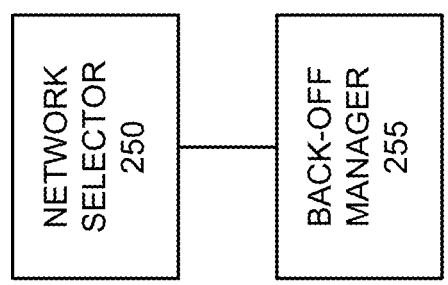
FIG. 2B is a diagram illustrating exemplary components of the MIU for providing an exemplary embodiment of the network selection service.

FIG. 2B is a diagram illustrating exemplary components of MIU 105 that may provide the network selection service, as described herein. For example, MIU 105 may include a network selector 250 and a back-off manager 255. Network selector 250 and back-off manager 255 may each be implemented using the components depicted in FIG. 2A. For example, network selector 250 and back-off manager 255 may be implemented using controller 208 and software 214. According to other exemplary embodiments, MIU 105 may include additional, fewer, and/or different components than those illustrated in FIG. 2B and described herein. For example, according to other exemplary embodiments, back-off manager 255 may be omitted. According to such an exemplary embodiment, back-off time values may be pre-configured and stored by MIU 105 for use.

Additionally, according to various exemplary embodiments, multiple components may be combined into a single component and/or a single component may be implemented as multiple components in which a process or a function may be collaboratively performed or multiple processes or functions may be split between them.

Network selector 250 includes logic that selects a wireless network to join or connect to based on preference information and back-off information. Network selector 250 may perform a selection process in response to various triggering events. According to an exemplary embodiment, network selector 250 may perform the selection process of a wireless network during an initialization process. For example, the initialization process may be triggered in response to a power-up procedure, a reset procedure, or a reboot procedure, as previously described. According to another exemplary embodiment, network selector 250 may perform the selection process of a wireless network during post-initialization. For example, when MIU 105 is in steady-state operation, network selector 250 may perform the selection process. For purposes of illustration, referring to FIG. 2C, an exemplary sequence of states is illustrated. As illustrated, along a time axis, a triggering event 256 may occur. For example, triggering event 256 may be an input into MIU 105 that causes MIU 105 to power up or reset, as previously described. Subsequent to the occurrence of triggering event 256, MIU 105 may enter an initialization state 257 of operation, and subsequent to the initialization state, MIU 105 may enter a steady-state 259 of operation.

According to an exemplary embodiment, the preference information and the back-off information pertain to a third party wireless network. As previously described, the preference information indicates a preference of a third party wireless network and/or carrier over another third party wireless network and/or carrier. The preference information may indicate one or multiple third party wireless networks and/or carriers. Further, as previously described, the back-off information indicates when a next attempt to select and access the third party wireless network is permitted. The preference information and the back-off information may be stored in any suitable data structure (e.g., a table, a list, etc.) or a database. For purposes of description, a table that stores preference information and back-off information is described below.

Figure 2D:
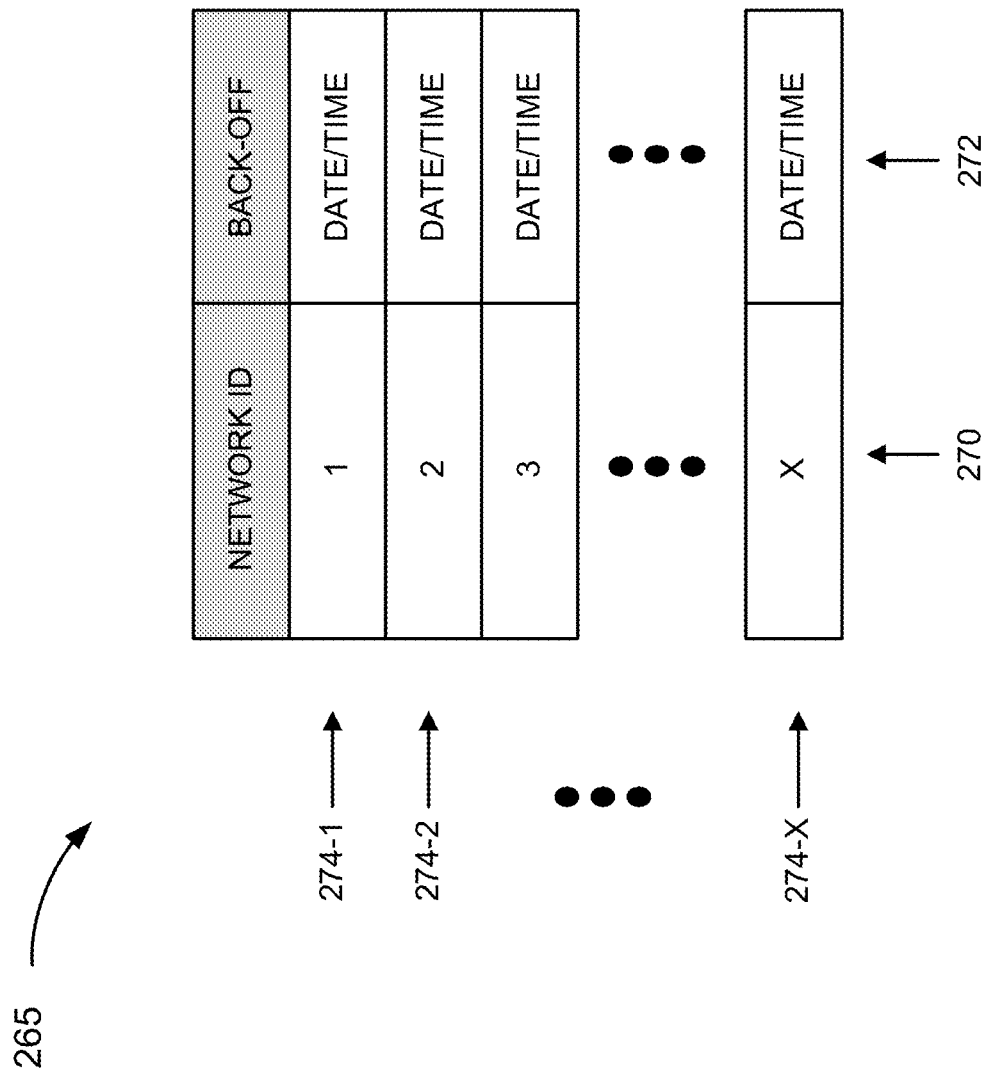
FIG. 2D is a diagram illustrating exemplary preference and back-off information.

FIG. 2D is a diagram illustrating an exemplary table 265 that may store preference information and back-off information. Table 265 may be stored in memory 210. Referring to FIG. 2D, table 265 may include a network identifier (ID) field 270 and a back-off field 272. As further illustrated, table 265 includes records 274-1 through 274-X (also referred to collectively as records 274 and generally or individually as record 274) that each includes a grouping of fields 270 and 272 that may be correlated. According to other exemplary embodiments, table 265 may include additional, fewer, and/or different fields than those described herein. The values illustrated and described for each field are exemplary.

According to an exemplary embodiment, records 274 may be arranged in a preferential order. For example, record 274-1 may have a higher preference over record 274-2 in terms of selection, access, and use. Additionally, the number of records is exemplary. For example, table 265 may store one or multiple records 274. Additionally, according to an exemplary embodiment, table 265 may be updated. For example, MIU 105 may be configured to add, delete, or modify a record, a field of a record, a preferential order of a record, and so forth.

Network ID field 270 may store data indicating a third party wireless network, a carrier of the third party wireless network, or both. For example, network ID field 270 may identify a LoRa network, a carrier (e.g., AT&T, etc.), or both.

Back-off field 272 may store data that indicates when the network is available for selection based on a back-off period. For example, back-off field 272 may store a date and a time. As described further below, according to some exemplary embodiments, back-off manager 255 may calculate the back-off period for a third party wireless network when MIU 105 is unsuccessful in accessing/joining the third party wireless network. According to other exemplary embodiments, MIU 105 may be pre-configured with back-off information. In this way, utilization of various resources (e.g., controller 208, power source 205, etc.) may be minimized by not having to calculate a back-off time period. Additionally, as described herein, the back-off information may pertain to other access networks 110 (e.g., access network 110-1, access network 110-2).

Referring to FIGS. 2B and 2D, as previously described, network selector 250 may select the third party wireless network to join or connect to based on the preference information and the back-off information. For example, network selector 250 may select the most preferred third party wireless network that is permitted to be selected in view of table 265 and one or multiple criteria (e.g., current date and time; mode of operation of MIU 105; data to be transmitted and/or received, etc.). Network selector 250 may determine whether a back-off period has expired or not based on MIU's 105 clock (e.g., a current date and time) and the date and time stored in back-off field 272. According to other examples, network selector 250 may select a third party wireless network based on different criteria. For example, network selector 250 may disregard the preference information and/or the back-off information. By way of further example, MIU 105 may receive a network command to access a particular wireless network or switch from one wireless network to another. As a result, the selection process may be performed based on the network command.

Referring back to FIG. 2B, back-off manager 255 includes logic that calculates a back-off period for a third party wireless network when MIU 105 is unsuccessful in accessing/joining the third party wireless network. For example, back-off manager 255 may include a back-off algorithm. As previously described, the back-off period may be calculated based on various criteria including, for example, whether or not MIU 105 has ever accessed and used the third party wireless network, as described herein. In this regard, for example, for circumstances in which MIU 105 may be configured to access and use a third party wireless network, even though the third party wireless network is not yet deployed in the geographic area of MIU 105 when MIU 105 was installed, the back-off period may be calculated based on this criterion (e.g., never having been previously accessed/joined). By way of example, the back-off period may be set to weeks, months, or another configurable time period. Conversely, for circumstances in which MIU 105 may be configured to access and use a third party wireless network that has been previously accessed and used, the back-off period may be calculated based on this criterion (e.g., having been previously accessed/joined).

Back-off manager 255 may also use other criteria when calculating the back-off period including, for example, a reason for the failure to access and/or join. For example, back-off manager 255 may calculate different back-off time periods depending on whether a frequency band/channel was detected during a scanning process, whether the failure relates to a timeout, invalid network credentials, the number of failed attempts to access/join the third party wireless network, and so forth. According to some exemplary embodiments, back-off manager 255 may calculate a back-off period for other wireless networks (e.g., access networks 110-1 and 110-2). As previously described, according to other exemplary embodiments, the back-off time period may be pre-configured based on various criteria, as described herein.

Figure 2E:
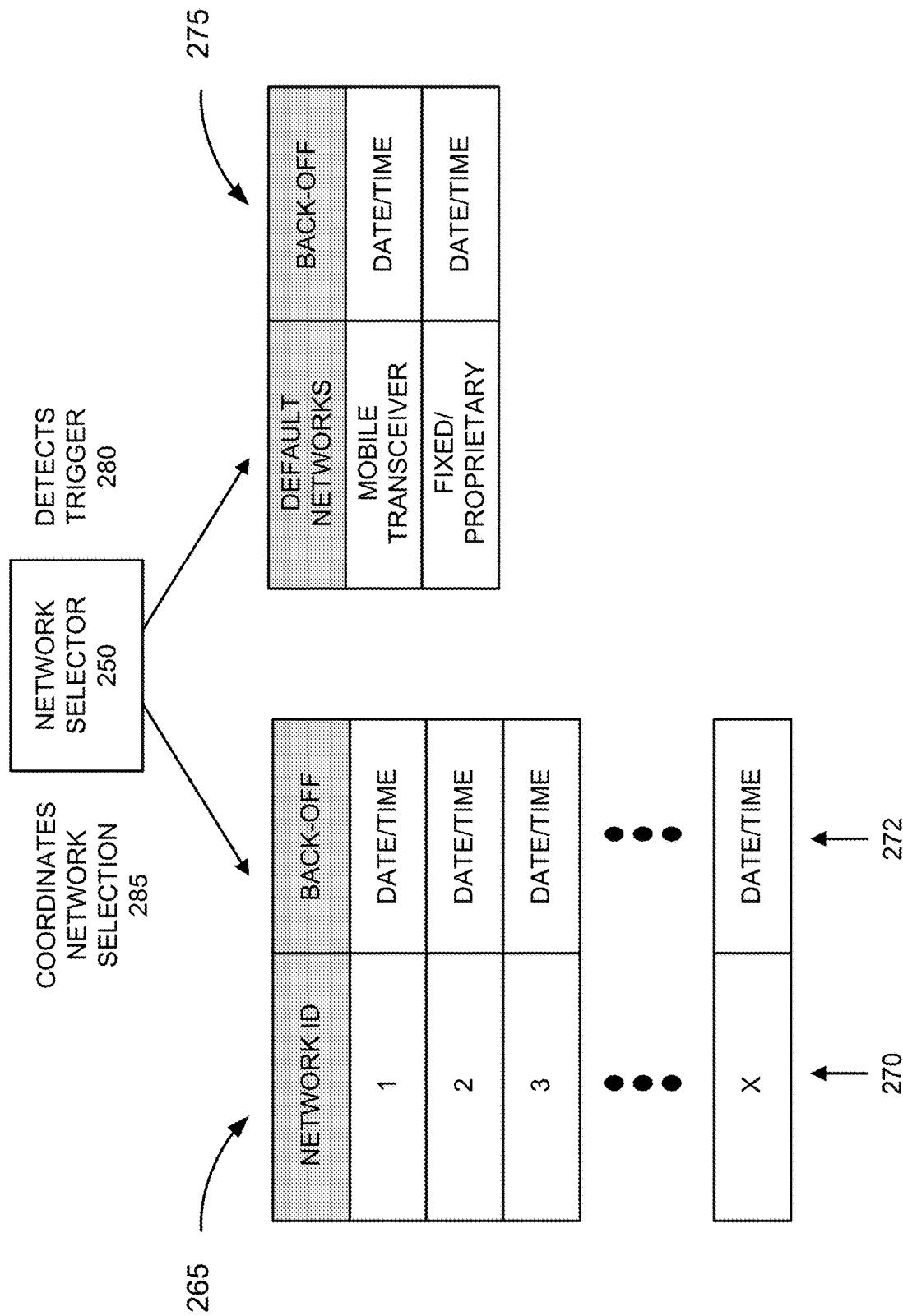
FIG. 2E is a diagram illustrating an exemplary process of the network selection service.

FIG. 2E is a diagram illustrating an exemplary process of the network selection service. As illustrated, network selector 250 may detect a trigger 280. For example, trigger 280 may occur during an installation process of MIU 105 in the field or subsequent to the installation of MIU 105 (e.g., while deployed and in use). According to some exemplary implementations, the input may cause MIU 105 to power-up and boot-up, or to reset/restart (which may or may not involve performing a power-cycle). According to other exemplary implementations, the input may be the receipt of a network command. The execution of the network command may or may not cause MIU 105 to power-up, boot-up, and/or a restart.

As further illustrated, network selector 250 may coordinate the network selection 285 in response to the detection of the triggering event. For example, for purposes of illustration and description, configuration data 275 is illustrated. Configuration data 275 may be stored in memory 210. Configuration data 275 may store default network information and back-off information pertaining to a default wireless network, such as a mobile transceiver network (e.g., access network 110-2) and a fixed wireless network (e.g., access network 110-1). According to some exemplary implementations, when there are multiple default networks, the default networks may be assigned a preference in terms of selection, access, and use. Additionally, configuration data 275 may store back-off data, which may generated by a back-off algorithm (e.g., back-off manager 255), or may be pre-configured. Network selector 250 may use configuration data 275 to coordinate the selection and attempts to access/join the default network. Further, as previously described, network selector 250 may be configured to coordinate the selection, access, and use of third party wireless networks based on, for example, table 265.

According to some exemplary embodiments, after successfully joining a third party wireless network for a first time, network selector 250 and/or back-off manager 255 may treat the third party wireless network as a default network. For example, network selector 250 may attempt to access and use the third party wireless network before other third party wireless networks that have yet to ever be successfully accessed or joined. Additionally, back-off manager 255 may calculate different back-offs for such a third party wireless network (e.g., in terms of time period of a back-off, required number of failed attempts before invoking a back-off period, etc.).

Although FIG. 2E illustrates an exemplary embodiment of a process of the network selection service, according to other exemplary embodiments, the process may include additional and/or different operations, and/or involve the storage and/or use of additional, fewer, and/or different instances of information.

As previously described, MIU 105 may use one or multiple networks for communication. According to an exemplary embodiment, MIU 105 is configured to operate in at least three "steady-state" modes. Steady-state refers to a state of operation of MIU 105 after it has been initialized and has begun transmitting its data at scheduled intervals. Additionally, MIU 105 may simultaneously operate in two or more of the steady-state modes.

According to an exemplary implementation of the steady-state modes, MIU 105 includes a mobile mode, a fixed/proprietary mode (simply referred to as a fixed mode), and a third party mode. The nomenclature of each steady-state mode is exemplary. According to other exemplary implementations, MIU 105 may include additional and/or different steady-state modes than those specifically described. When operating in the mobile mode, MIU 105 may communicate with mobile transceiver 114. When operating in the fixed/proprietary mode, MIU 105 may communicate with collector 112, and when operating in the third party mode, MIU 105 may communicate with a third party wireless network (e.g., access network 110-Y) that includes a wireless station, as described herein.

While operating in each steady-state mode, MIU 105 may transmit data and/or receive data according to configuration data that may govern various communication parameters (e.g., power, data rate, transmit interval, receive interval, modulation scheme, communication protocol, frequency band, etc.) pertaining to the steady-state mode. A communication parameter may include a value when operating in a single steady-state mode and another value when simultaneously operating in multiple steady-state modes. Additionally, MIU 105 may use other types of configuration data (e.g., network credentials, etc.) to access or join a particular wireless network. MIU 105 may obtain network credentials, for example, during an initialization process or during the execution of a join procedure with a wireless network. The network credentials may be updated using various command packets. Alternatively, MIU 105 may be pre-configured with a network credential prior to installation.

According to some exemplary embodiments, while operating in the third party mode, MIU 105 may adapt the values of the communication parameters and/or use values that are variable. The range of values pertaining to the communication parameter may depend on the type of third party wireless network. For example, MIU 105 may vary power level and data rate. By way of further example, MIU 105 may initial transmit data (e.g., water usage data) at a highest power level using a lowest available data rate. Depending on the operating environment and context, the transmission settings may be adapted by decreasing the power level and/or increasing the data rate. Additionally, or alternatively, a size of a meter reading packet may be adapted. For example, the size of the meter reading packet, which carries meter usage data (e.g., water usage data), may be decreased when transmitting at a low data rate and increased when transmitting at a higher data rate. As an example, the size of the meter reading packet may be decreased by reducing or removing status information (e.g., of MIU 105 or meter 102) and/or the number of past meter reading data. The availability of larger packet sizes (e.g., relative to mobile mode and/or fixed mode) may also permit further refinements to the configuration of MIU 105. For example, MIU 105 may be adaptively configured, which may be accomplished through downlink communications, while operating in the third party mode and/or another steady-state mode. For instance, a variety of the operational settings of MIU 105 may be reconfigured including its clock, transmission interval, data rate, transmission power level, number of retransmission attempts after a failed transmission, the duration of receive windows, the number of receive windows, and so forth.

As previously described, MIU 105 may operate in two or more steady-state modes. For example, MIU 105 may operate simultaneously in the mobile mode and the fixed mode. Alternatively, for example, MIU 105 may operate simultaneously in the mobile mode and the third party mode. According to yet another example, MIU 105 may operate simultaneously in three or more steady-state modes.

According to an exemplary embodiment, MIU 105 may interleave transmissions and receptions associated with each steady-state mode. According to other exemplary embodiments, MIU 105 may simultaneously transmit and/or receive data with each steady-state mode (e.g., using multiple transceivers). Additionally, according to an exemplary implementation, one steady-state mode may be assigned a higher priority for transmissions and/or receptions relative to another steady-state mode when simultaneously operating in multiple communication modes. For example, transmissions occurring in the third party mode may be given higher priority than transmissions occurring in the mobile mode. Additionally, for example, the values for various communication parameters used for each steady-state mode may be different. For example, the power level for transmissions while operating in the third party mode may be higher than the power level for transmissions while operating in the mobile mode.

FIGS. 3A-3G are exemplary diagrams illustrating exemplary processes performed by MIU 105 that includes the network selection service, as described herein. As illustrated, the horizontal axis represents time and the vertical axis represents Effective Isotropic Radiated Power (EIRP). Some diagrams illustrate triggering event 256, initialization state 257, and steady-state 259, as previously described, while other diagrams illustrate fewer operational states (e.g., for purposes of brevity).

Figure 3A:
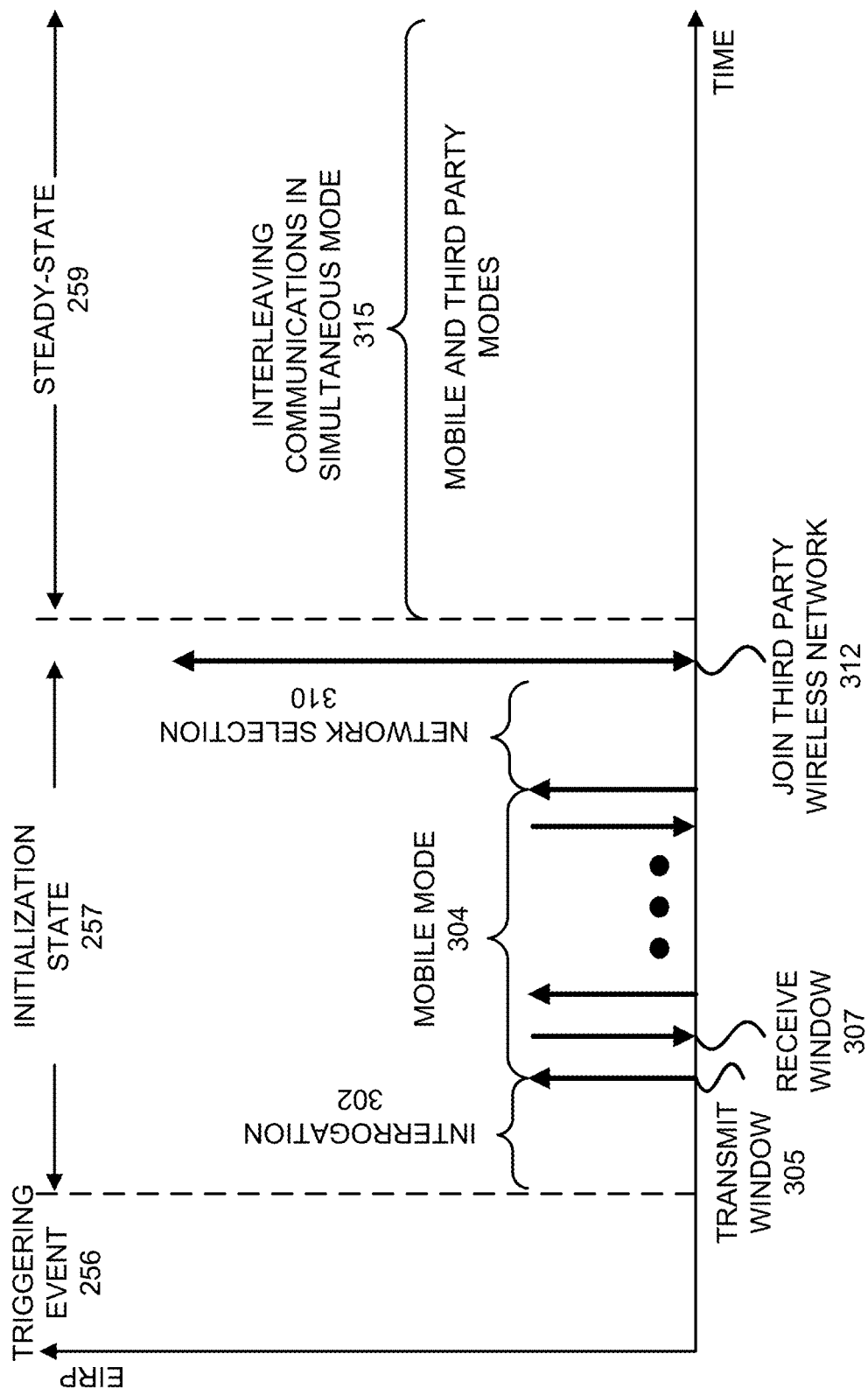
FIGS. 3A-3G are diagrams illustrating processes of an exemplary embodiment of the network selection service.

Referring to FIG. 3A, MIU 105 may detect a triggering event 256. For example, the triggering event may be an input to power-up, reboot, or restart, as previously described. Subsequently, MIU 105 may operate in initialization state 257. For example, during the initialization state 257, MIU may perform an interrogation 302 of meter 102 to determine various types of information, such as the type of meter 102 and a current meter reading value (e.g., amount of water used in gallons). Additionally, for example, MIU 105 may attempt to enter into communication with access network 110-2 (e.g., mobile transceiver 114), which may be associated with a technician or meter reader of a utility company (e.g., illustrated as mobile mode 304). MIU 105 may attempt to connect to mobile transceiver 114) for a pre-defined period of time. According to this exemplary scenario, assume that the attempt was successful and transmissions and receptions of data occur within a transmit window 305 and a receive window 307, as illustrated. Although not illustrated, according to other exemplary scenarios, this may not be the case.

Further, according to this exemplary scenario, MIU 105 may perform a network selection process 310. The network selection process 310 includes selecting a third party wireless network (e.g., access network 110-Y), as previously described. Subsequent to selecting the third party wireless network, MIU 105 may attempt to enter into communication with the selected third party wireless network (illustrated as join third party wireless network 312). The access/join process may include using a network credential (e.g., a network identifier, a network key, and/or other types of network credentials). According to various exemplary implementations, the network credential may be pre-configured, previously stored subsequent to installation, or received during receive window 307. According to this exemplary scenario, assume that the attempt was successful. Although not illustrated, according to other exemplary scenarios, this may not be the case. Subsequently, MIU 105 may enter steady-state 259, in which MIU 105 may interleave communications between access networks 110-2 and 110-Y in a simultaneous mode 315.

Figure 3B:
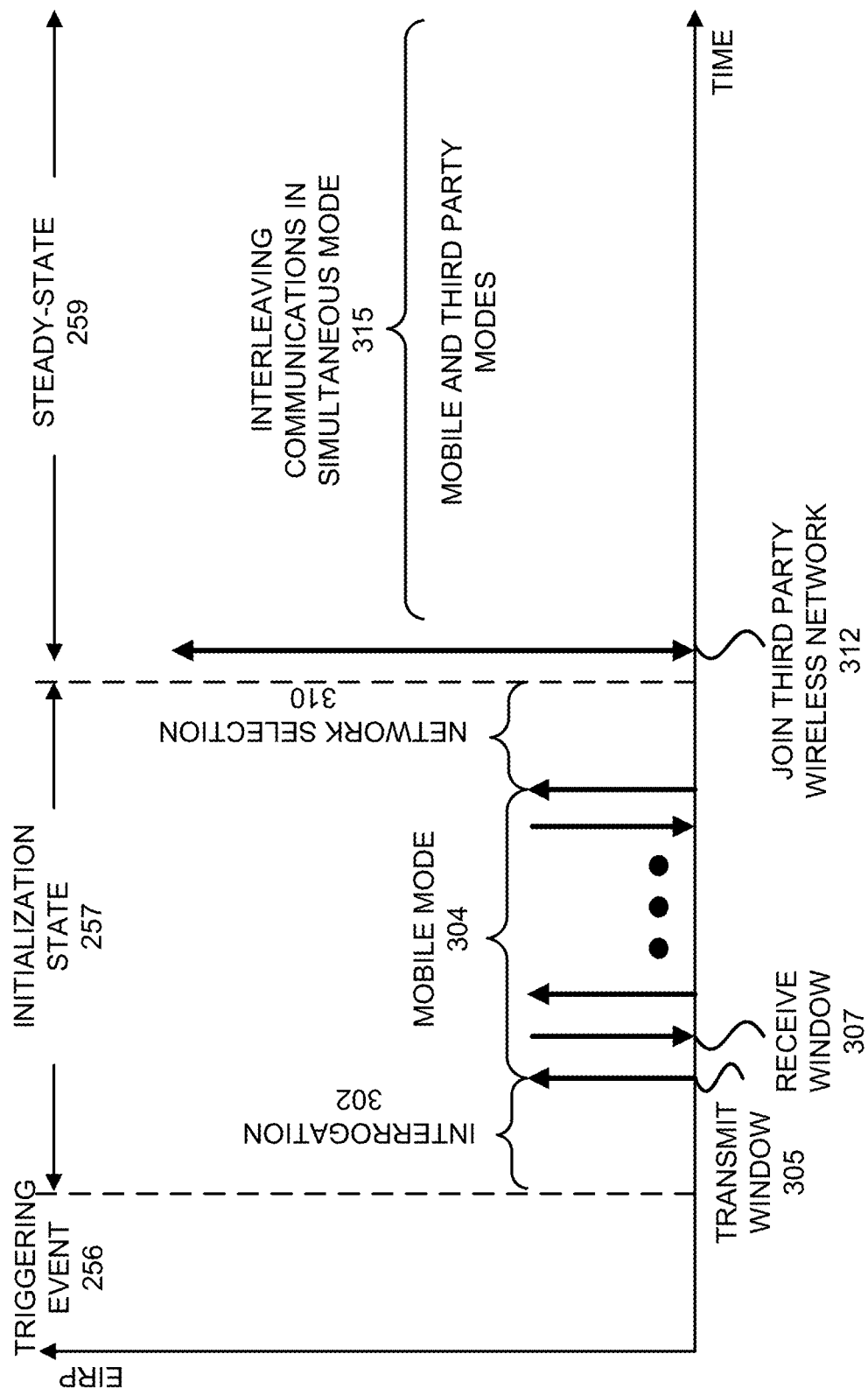
Figure 3C:
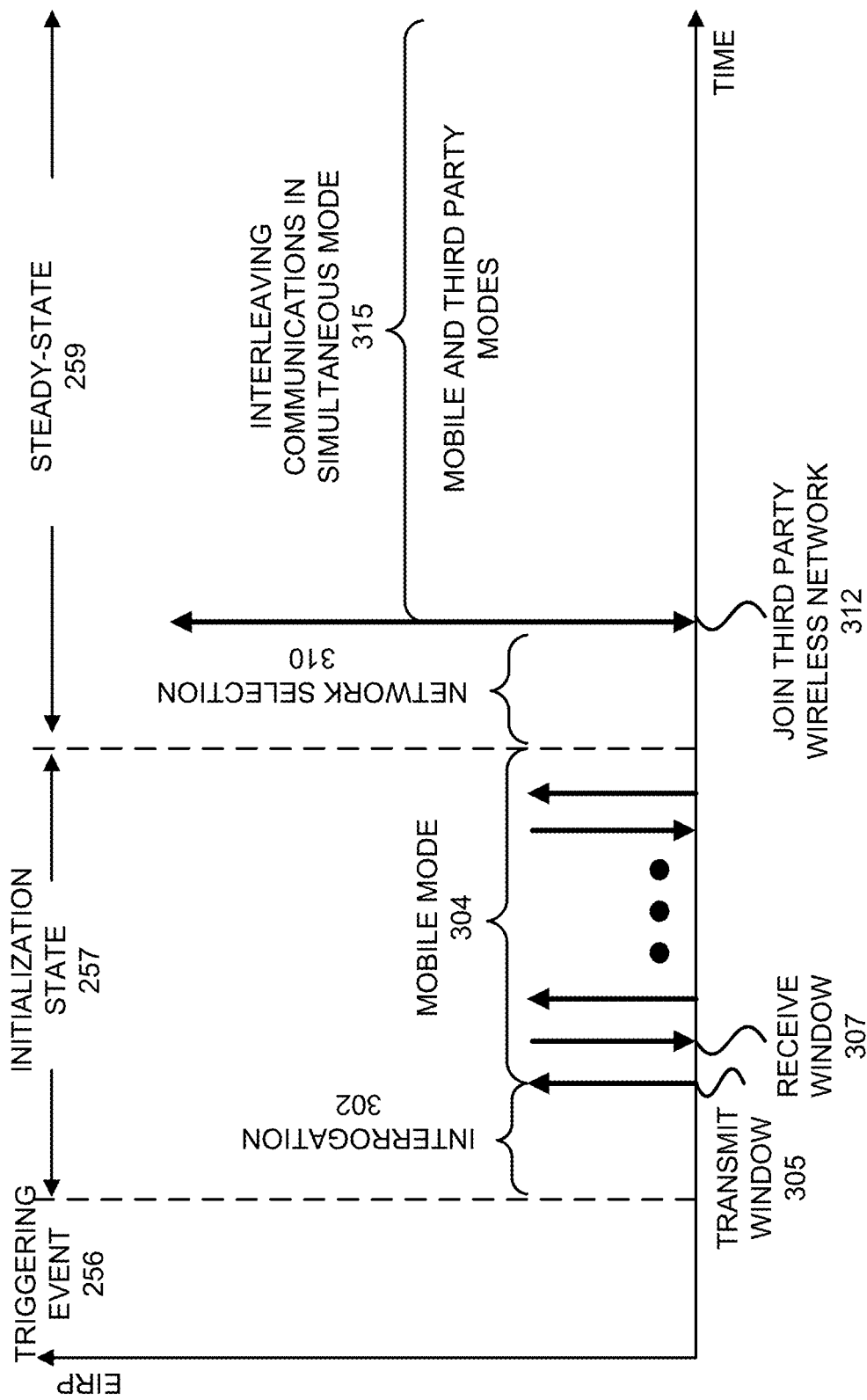

Referring to FIG. 3B, a similar process to that previously described in relation to FIG. 3A may be performed, except that the access or join procedure for the selected third party wireless network may occur during steady-state operation. Further, referring to FIG. 3C, a similar process to that previously described in relation to FIG. 3A may be performed, except that the network selection process and the access or join procedure may be performed during steady-state 259.

Figure 3D:
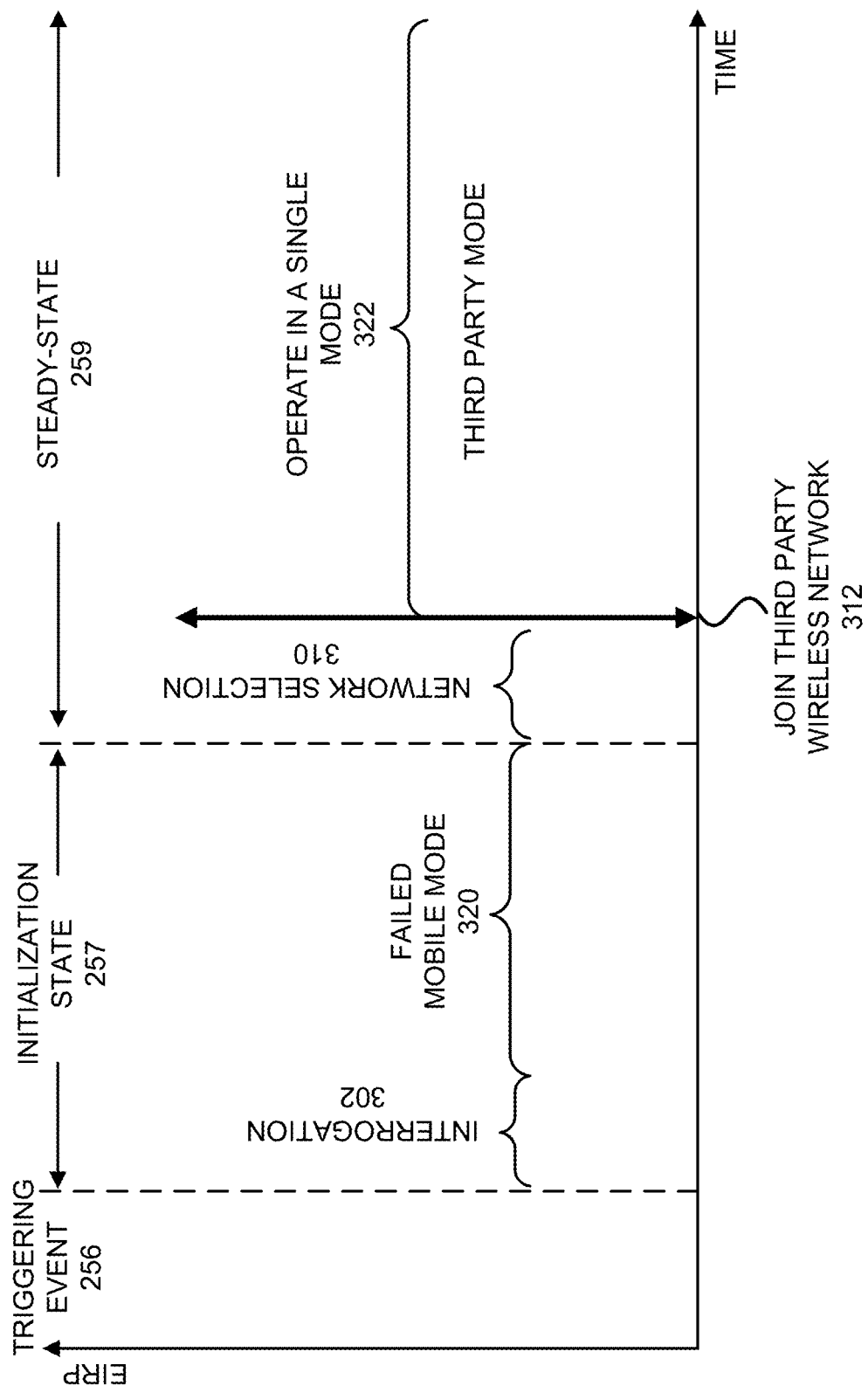

Referring to FIG. 3D, a similar process to that previously described in relation to FIG. 3A may be performed, except as illustrated, MIU 105 fails to establish communication with access network 110-2 during initialization state 257 (e.g., illustrated as failed mobile mode 320). While FIG. 3D illustrates that network selection 310 and join of third party wireless network 312 occurring while in steady-state 259, one or both of these processes may occur while in initialization state 257, as previously described in relation to FIGS. 3A and 3B. As further illustrated in FIG. 3D, while in steady-state 259, MIU 105 may operate in a single mode 322 (e.g., a third party mode). Although not illustrated, MIU 105 may re-attempt to establish communication with access network 110-2 (e.g., mobile transceiver 114) and/or attempt to establish communication with access network 110-1 (e.g., collector 112).

Figure 3E:
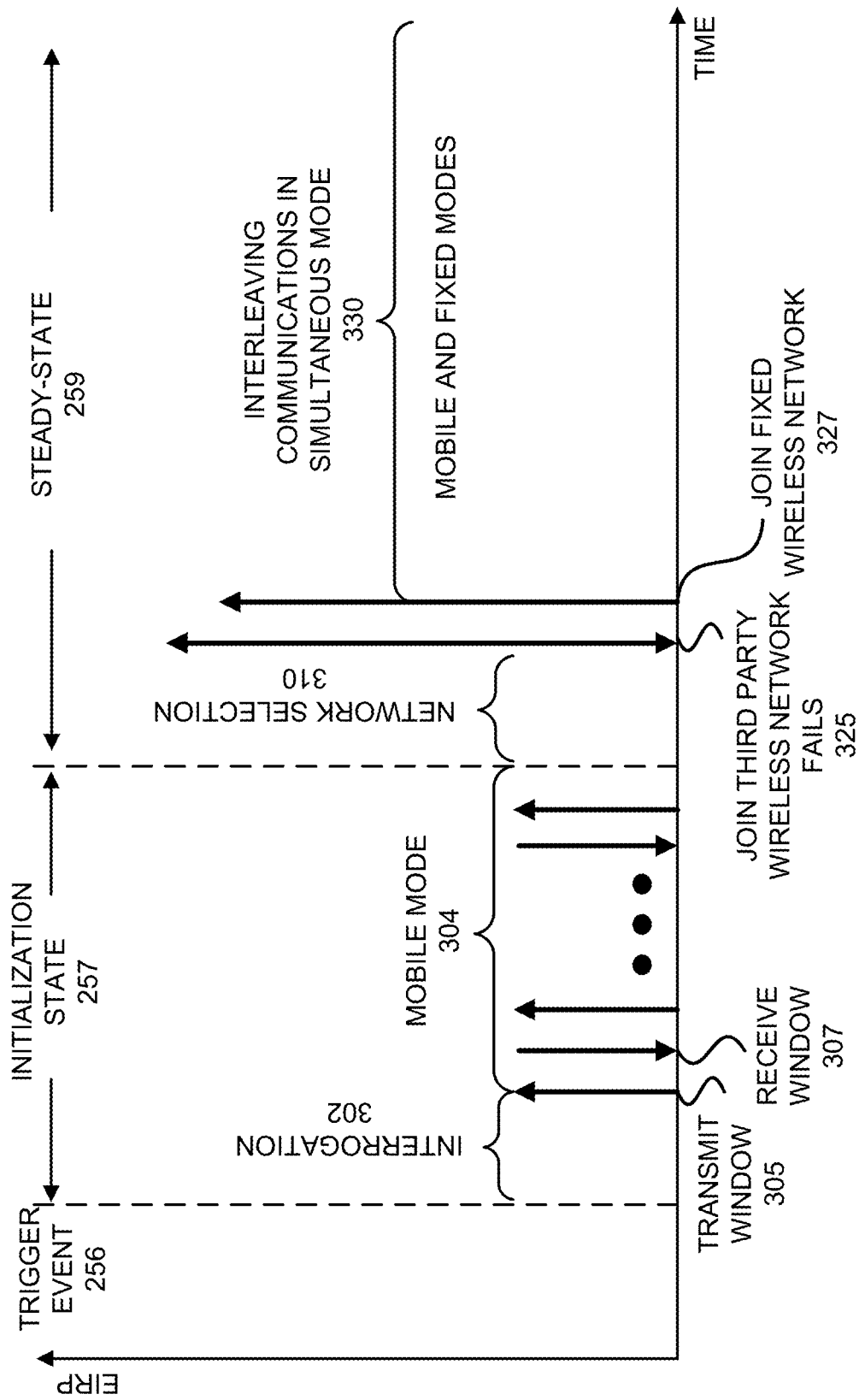

Referring to FIG. 3E, a similar process to that previously described in relation to FIG. 3A may be performed, except as illustrated, MIU 105 fails to join third party wireless network 325. According to this exemplary scenario, MIU 105 attempts to communicate with a fixed wireless network 327 (e.g., access network 110-1). With the assumption that MIU 105 is successful, MIU 105 interleaves communications between access networks 110-1 and 110-2 in simultaneous mode 330 in which MIU 105 operates in mobile and fixed modes.

Figure 3F:
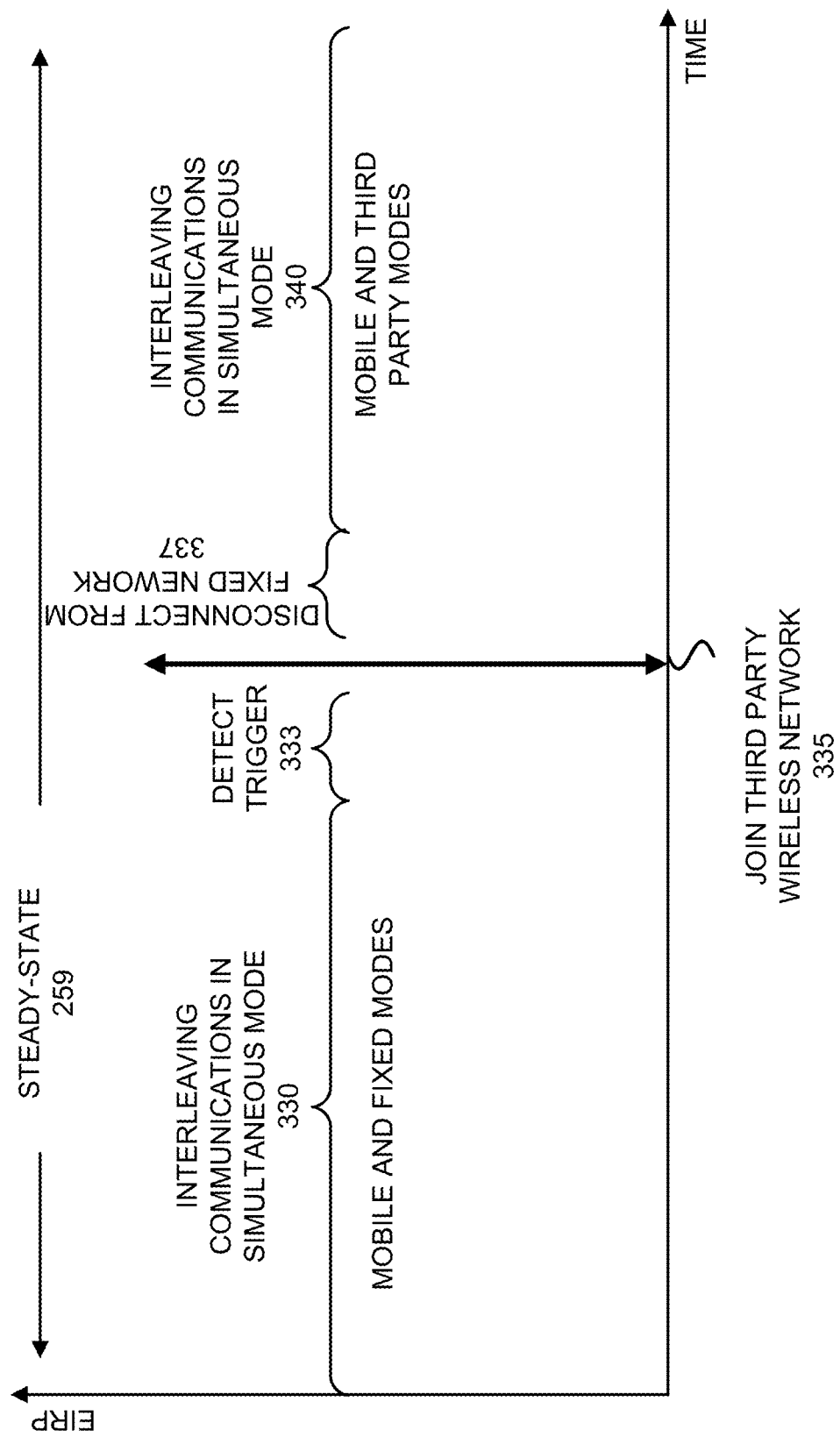
Figure 3G:
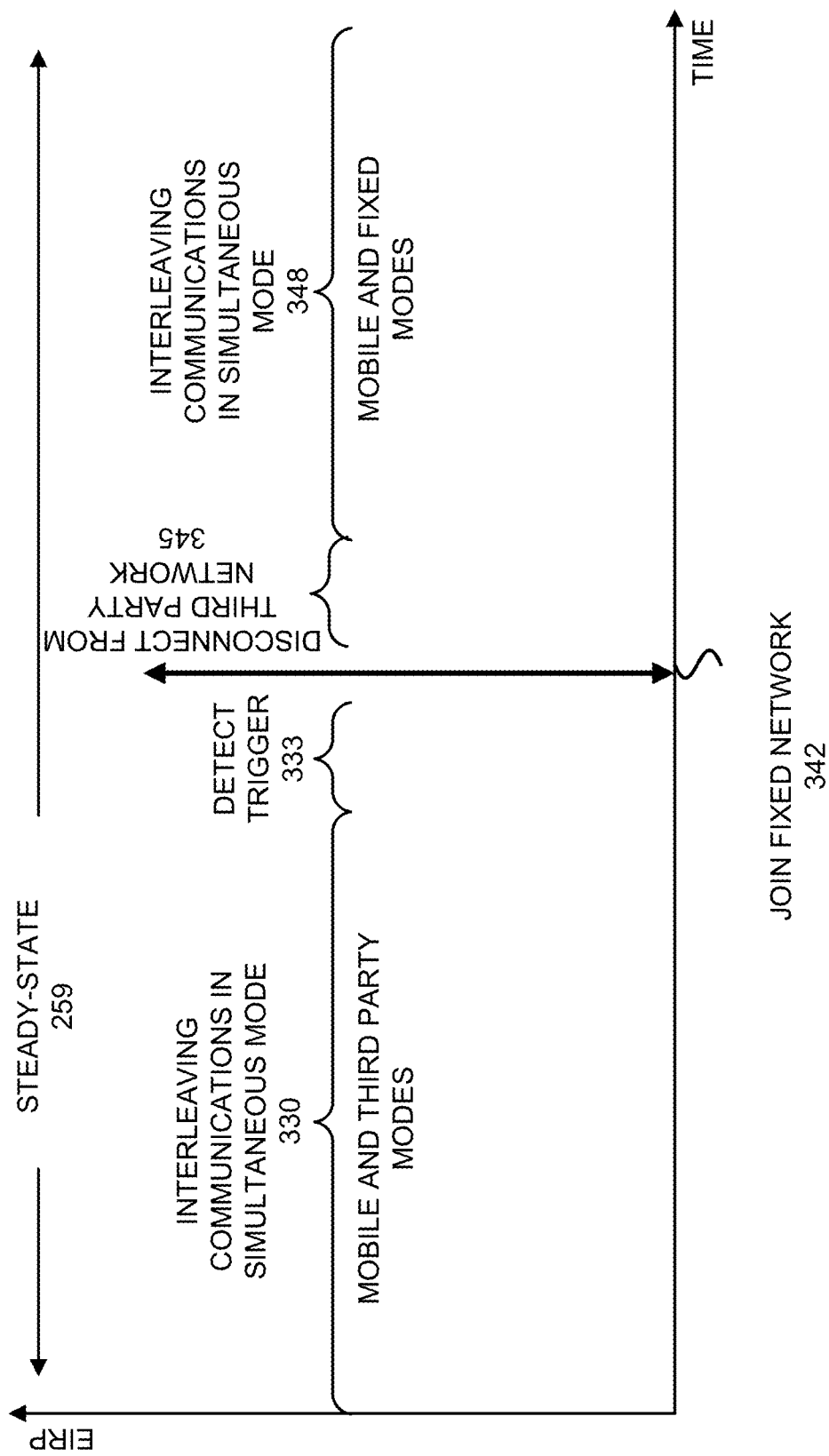

FIGS. 3F and 3G are diagrams that illustrate a trigger occurring while in steady-state 259. For example, the trigger may be a receipt of a network command while operating in communication mode (e.g., mobile, fixed, third party). Alternatively, for example, the trigger may be the detection of an expiration of a back-off time period by MIU 105 (e.g., network selector 250) or in accordance with a schedule for joining a third party wireless network. Referring to FIG. 3F, according to this exemplary scenario, MIU 105 may be in steady-state 259 and operating in mobile and fixed modes. Thereafter, MIU 105 may detect a trigger 333, as previously described. Trigger 333 may or may not indicate a particular third party wireless network. In response to the trigger, MIU 105 may attempt to join a third party wireless network 335. According to some exemplary implementations, depending on the content or type of trigger, although not illustrated, MIU 105 may perform a selection process. According to this exemplary scenario, assume that MIU 105 successfully accesses or joins the third party wireless network and disconnects from a fixed network 337. Thereafter, MIU 105 interleaves communication between access networks 110-2 and 110-Y in simultaneous mode 340 (e.g., mobile and third party modes), as illustrated. FIG. 3G is a diagram similar to FIG. 3F except the switch is from a third party mode to a fixed mode, which includes similar operations, such as joining a fixed network 342, disconnecting from a third party network 345, and interleaving communications between access networks 110-1 and 110-2 in simultaneous mode 348 (e.g., mobile and fixed modes).

While FIGS. 3A-3G illustrate exemplary processes based on particular exemplary scenarios, according to other exemplary embodiments, MIU 105 may perform additional, fewer, and/or different operations depending on context.

Figure 4:
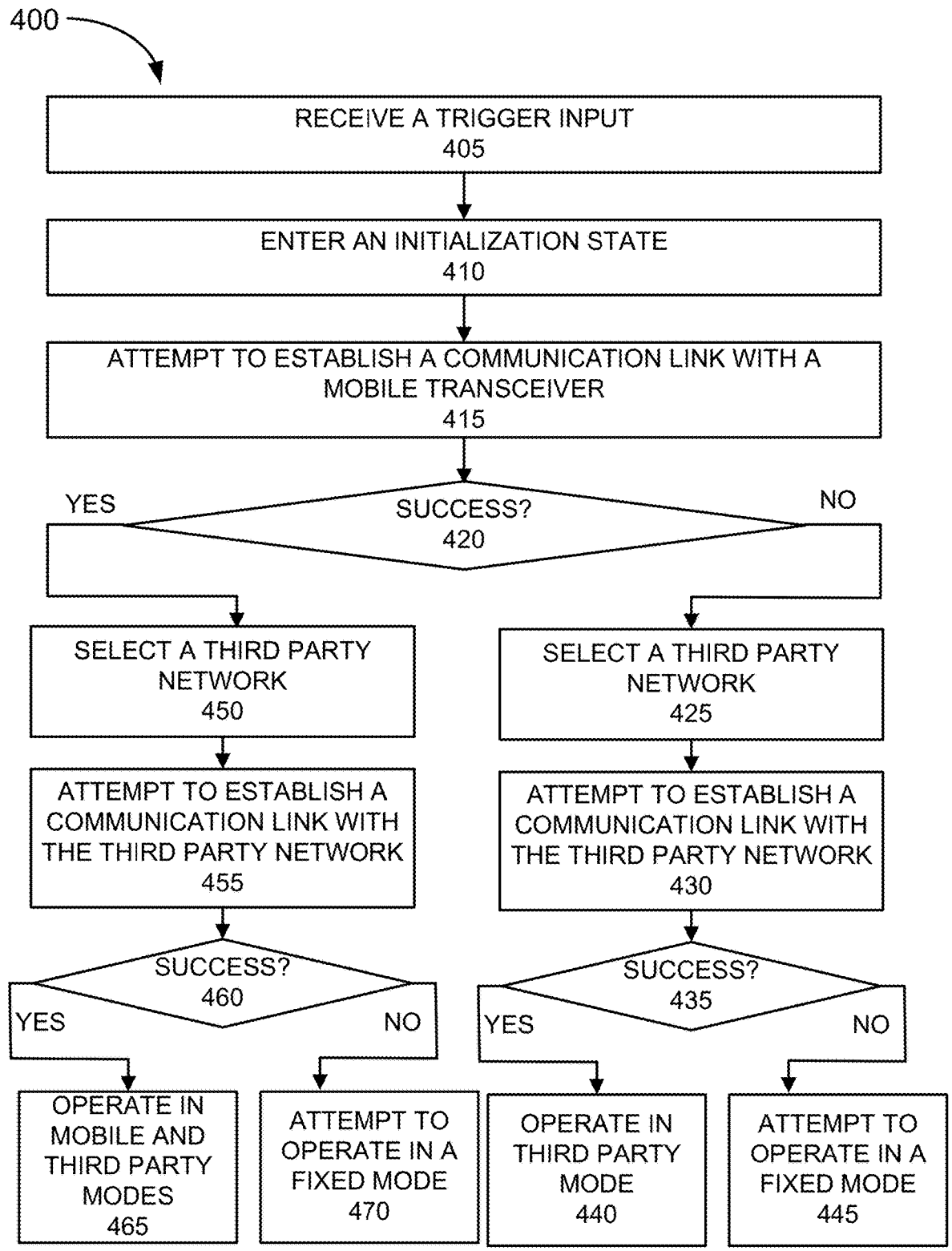
FIG. 4 is a flow diagram illustrating an exemplary process of an exemplary embodiment of the network selection service.

FIG. 4 is a flow diagram illustrating an exemplary process 400 of an exemplary embodiment of the network selection service. According to an exemplary embodiment, MIU 105 performs steps of process 400. For example, controller 208 executes software 214 to perform the steps illustrated in FIG. 4, and described herein.

Process 400 may begin, in block 405, in which a trigger input is received. For example, MIU 105 may receive an input to power-up, re-boot, or reset.

In block 410, an initialization state may be entered. For example, MIU 105 may operate in an initialization state. The initialization state may include interrogating meter 102.

In block 415, establishment of a communication link with a mobile transceiver may be attempted. For example, during operation in the initialization state, MIU 105 may attempt to establish a communication link with access network 110-2. For example, according to an exemplary implementation, the initialization procedure may include attempting to establish communication with one or multiple default networks (e.g., access network 110-2). According to some exemplary implementations, MIU 105 may scan for a frequency band or channel associated with access network 110-2.

In block 420, it is determined whether the establishment of the communication link is successful. For example, MIU 105 may determine whether the communication link with access network 110-2 has been established. For example, this determination may be based on a message-based handshake or another type of administratively configurable criterion.

When it is determined that a communication link with a mobile transceiver has not been established (block 420—NO), a third party wireless network may be selected (block 425). For example, MIU 105 may perform a network selection process for a third party wireless network. The network selection process may be performed during the initialization state or during a steady-state, as previously described.

In block 430, in response to the selection, establishment of a communication link the selected third party wireless network may be attempted. For example, MIU 105 may attempt to access and join the selected third party wireless network (e.g., access network 110-Y). For example, according to some exemplary implementations, MIU 105 may scan for a frequency band or channel associated with access network 110-Y. Additionally, for example, MIU 105 may transmit a message. The message may include a request to attach, a network credential, and/or other content based on the communication standard of the particular access network 110-Y.

In block 435, it is determined whether the establishment of the communication link is successful. For example, MIU 105 may determine whether the communication link with access network 110-Y has been established. For example, this determination may be based on a message-based handshake or other criteria pertaining to an attach procedure.

When it is determined that a communication link with the third party wireless network has been established (block 435—YES), a third party mode of operation may be performed (block 440). For example, MIU 105 may operate in a third party mode of communication with access network 110-Y. By way of further example, MIU 105 may transmit meter usage information (e.g., water usage) and/or other type of information to network device 125 (e.g., a backend system of a water utility company) via access network 110-Y. When it is determined that a communication link with the third party wireless network has not been established (block 435—NO), a fixed mode of operation may be attempted (block 445). For example, MIU 105 may attempt to establish a communication link with access network 110-1 and operate in a fixed mode. In this fixed mode, MIU 105 may transmit meter usage information (e.g., water usage) and/or other type of information to network device 125 via access network 110-1 (e.g., the water utility company's proprietary network).

Referring back to block 420, when it is determined that a communication link with a mobile transceiver has been established (block 420—YES), a third party wireless network may be selected (block 450). For example, MIU 105 may perform a network selection process for a third party wireless network. The network selection process may be performed during the initialization state or during a steady-state, as previously described.

In block 455, in response to the selection, establishment of a communication link the selected third party wireless network may be attempted. For example, MIU 105 may attempt to access and join the selected third party wireless network (e.g., access network 110-Y). For example, according to some exemplary implementations, MIU 105 may scan for a frequency band or channel associated with access network 110-Y. Additionally, for example, MIU 105 may transmit a message. The message may include a request to attach, a network credential, and/or other content based on the communication standard of the particular access network 110-Y.

In block 460, it is determined whether the establishment of the communication link is successful. For example, MIU 105 may determine whether the communication link with access network 110-Y has been established. For example, this determination may be based on a message-based handshake or other criteria pertaining to an attach procedure.

When it is determined that a communication link with the third party wireless network has been established (block 465—YES), a mobile mode and a third party mode of operation may be performed (block 465). For example, MIU 105 may operate in a third party mode of communication with access network 110-Y and a mobile mode of operation with access network 110-2. When it is determined that a communication link with the third party wireless network has not been established (block 460—NO), a fixed mode of operation may be attempted (block 470). For example, MIU 105 may attempt to establish a communication link with access network 110-1 and operate in a fixed mode, as well as operate in the mobile mode.

Although FIG. 4 illustrates an exemplary process 400 of the network selection service, according to other embodiments, process 400 may include additional operations, fewer operations, and/or different operations than those illustrated in FIG. 4, and described herein. For example, with respect to blocks 440 and 445, MIU 105 may re-attempt to establish communication with access network 110-2 (e.g., mobile transceiver 114). Additionally, for example, with respect to block 470, MIU 105 may re-attempt to establish communication with a third party wireless network (e.g., base station 118, gateway 116, etc.).

Figure 5:
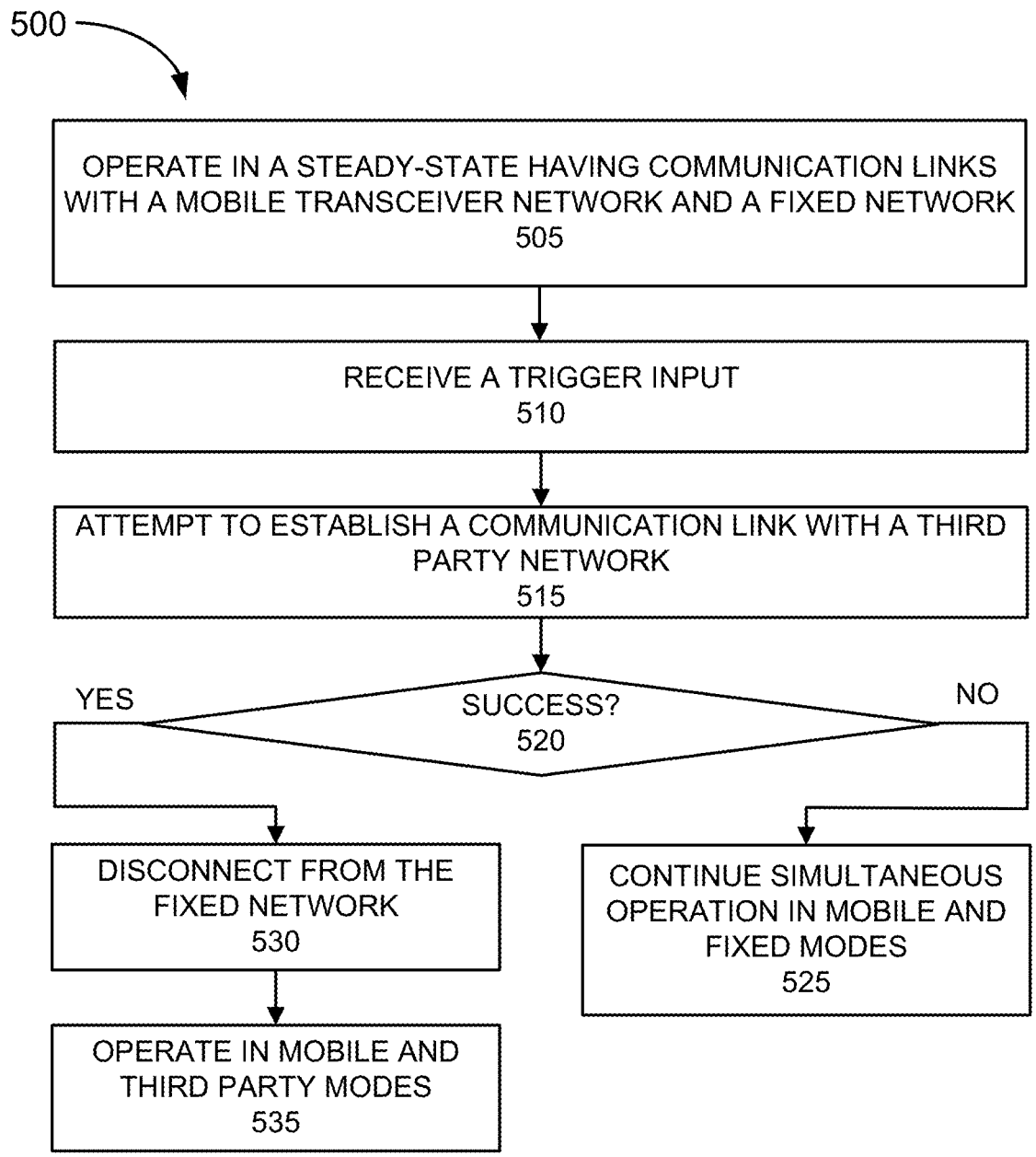
FIG. 5 is a flow diagram illustrating another exemplary process of an exemplary embodiment of the network selection service.

FIG. 5 is flow diagram illustrating another exemplary process 500 of an exemplary embodiment of the network selection service. According to an exemplary embodiment, MIU 105 performs steps of process 500. For example, controller 208 executes software 214 to perform the steps illustrated in FIG. 5, and described herein.

In block 505, while operating in a steady-state, communication links with a mobile transceiver network and a fixed network have been established. For example, MIU 105 may be operating in a mobile mode (e.g., connected to or connected to and communicating with access network 110-2) and a fixed mode (e.g., connected to or connected to and communicating with access network 110-1).

In block 510, a triggering event may be received. For example, MIU 105 may receive a network command, from the mobile transceiver network or the fixed network that causes MIU 105 to attempt to switch from the fixed network to a third party wireless network. Alternatively, the trigger may stem from the network selection process (e.g., expiration of a back-off period, etc.).

In block 515, establishment of a communication link with a third party wireless network may be attempted. For example, in response to the receipt of the trigger input, MIU 105 may attempt to establish a communication link with access network 110-Y. MIU 105 may perform a selection of the third party wireless network before the attempt is made.

In block 520, it is determined whether the establishment of the communication link is successful. For example, MIU 105 may determine whether the communication link with access network 110-Y has been established. For example, this determination may be based on a message-based handshake or other criteria pertaining to an attach procedure.

When it is determined that establishment with the third party wireless network is not successful (block 520—NO), simultaneous operation in the mobile and fixed modes may continue (block 525). For example, MIU 105 may continue to operate in the mobile and fixed modes and remain connected to/communicating with access networks 110-1 and 110-2.

When it is determined that establishment with the third party wireless network is successful (block 520—YES), a disconnection procedure with the fixed network may be performed (block 530). For example, MIU 105 may disconnect from access network 110-1 (e.g., collector 112).

In block 535, operations in a mobile mode and a third party mode may be performed. For example, MIU 105 may operate in the mobile mode and the third party mode. MIU 105 may interleave data or simultaneously transmit/receive data via access networks 110-2 and access network 110-Y.

Although FIG. 5 illustrates an exemplary process 500 of the network selection service, according to other embodiments, process 500 may include additional operations, fewer operations, and/or different operations than those illustrated in FIG. 5, and described herein.

Figure 6:
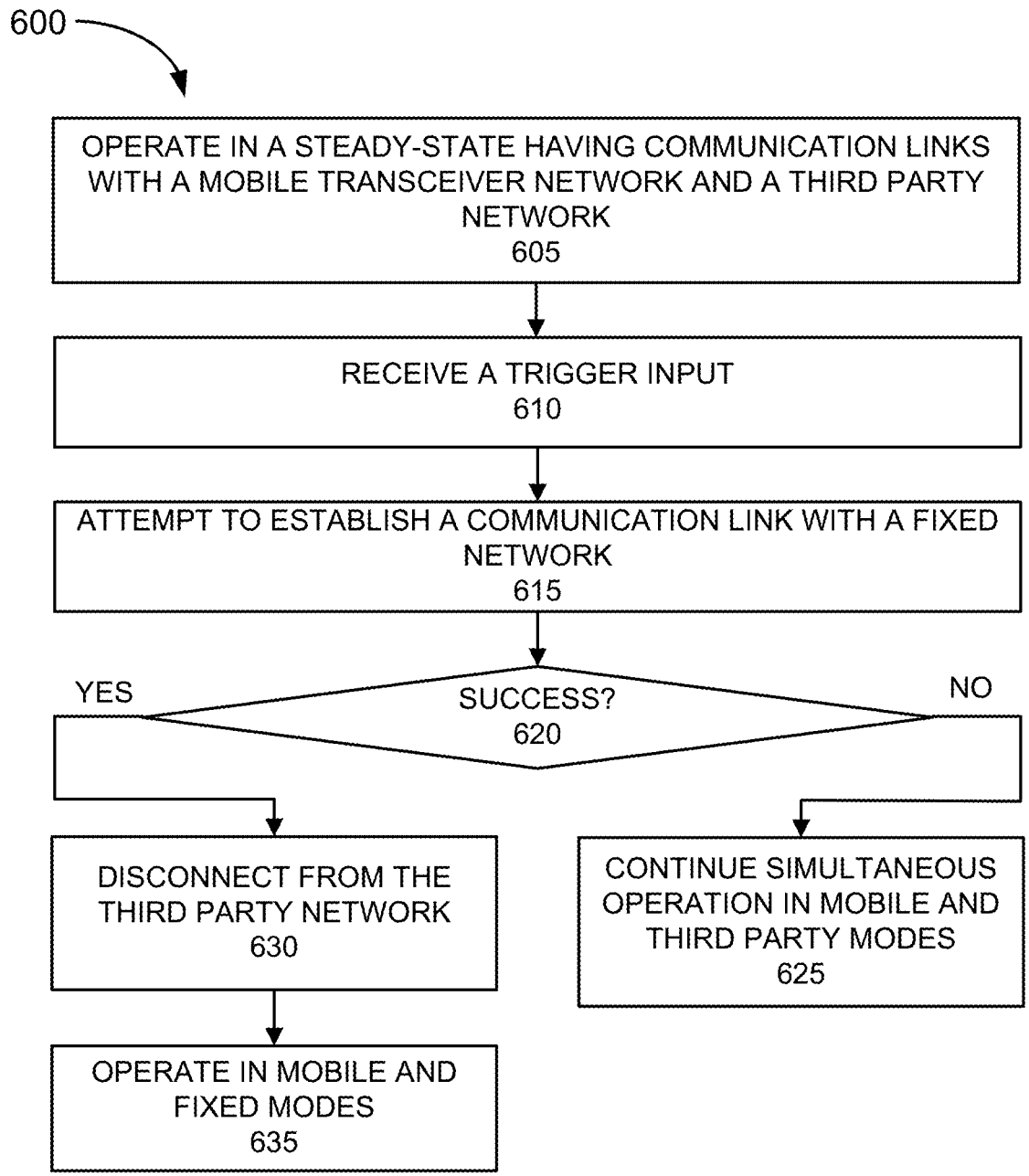
FIG. 6 is a flow diagram illustrating yet another exemplary process of an exemplary embodiment of the network selection service.

FIG. 6 is flow diagram illustrating yet another exemplary process 600 of an exemplary embodiment of the network selection service. According to an exemplary embodiment, MIU 105 performs steps of process 600. For example, controller 208 executes software 214 to perform the steps illustrated in FIG. 6, and described herein.

In block 605, while operating in a steady-state, communication links with a mobile transceiver network and a third party wireless network have been established. For example, MIU 105 may be operating in a mobile mode (e.g., connected to or connected to and communicating with access network 110-2) and a third party mode (e.g., connected to or connected to and communicating with access network 110-Y).

In block 610, a triggering event may be received. For example, MIU 105 may receive a network command, from the mobile transceiver network that causes MIU 105 to attempt to switch from the third party wireless network to a fixed network. Alternatively, the trigger may stem from the network selection process (e.g., expiration of a back-off period, etc.).

In block 615, establishment of a communication link with a fixed network may be attempted. For example, in response to the receipt of the trigger input, MIU 105 may attempt to establish a communication link with access network 110-1.

In block 620, it is determined whether the establishment of the communication link is successful. For example, MIU 105 may determine whether the communication link with access network 110-1 has been established. For example, this determination may be based on a message-based handshake or other criteria pertaining to an attach procedure.

When it is determined that establishment with the fixed network is not successful (block 620—NO), simultaneous operation in the mobile and third party modes may continue (block 625). For example, MIU 105 may continue to operate in the mobile and third party modes and remain connected to/communicating with access networks 110-2 and 110-Y.

When it is determined that establishment with the fixed network is successful (block 620—YES), a disconnection procedure with the fixed network may be performed (block 630). For example, MIU 105 may disconnect from access network 110-Y (e.g., gateway 116, base station 118, etc.).

In block 635, operations in a mobile mode and a fixed mode may be performed. For example, MIU 105 may operate in the mobile mode and the fixed mode. MIU 105 may interleave data or simultaneously transmit/receive data via access networks 110-1 and access network 110-2.

Although FIG. 6 illustrates an exemplary process 600 of the network selection service, according to other embodiments, process 600 may include additional operations, fewer operations, and/or different operations than those illustrated in FIG. 6, and described herein.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 4-6, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., controller 208, etc.), or a combination of hardware and software (e.g., software 214).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

The terms "about" and "approximately" shall generally mean an acceptable degree of error or variation for the quantity measured given the nature or precision of the measurements. Typical, exemplary degrees of error or variation are within 20 percent (%), preferably within 10%, and more preferably within 5% of a given value or range of values. Numerical quantities given in this description are approximate unless stated otherwise, meaning that the term "about" or "approximately" can be inferred when not expressly stated.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., controller 208) of a device.

No element, act, or instruction set forth in this description should be construed as critical or essential to the embodiments described herein unless explicitly indicated as such. All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:
1. A method comprising:
  receiving, by a meter interface device communicatively coupled to a utility meter, a trigger input;

attempting, by the meter interface device in response to said receiving the trigger input, to establish a first communication link with a mobile transceiver of a first network;

attempting, by the meter interface device subsequent to the attempting to establish the first communication link, to establish a second communication link with a second wireless network, wherein the second wireless network is a third party wireless network;

attaching, by the meter interface device in response to successfully establishing the second communication link, to the third party wireless network;

waiting, by the meter interface device in response to unsuccessfully establishing the second communication link, a back-off time period before re-attempting to establish the second communication link; and transmitting, by the meter interface device while operating in a simultaneous mode, first data to the mobile transceiver of the first network and second data to the second wireless network, wherein the transmitting includes interleaving the first data and the second data.

2. The method of claim 1, wherein the trigger input includes a swipe of a magnet across a sensor of the meter interface device or a manual input at the meter interface device, and wherein the trigger input causes the meter interface device to at least one of perform a power cycle procedure, a reset procedure, or a reboot procedure.

3. The method of claim 1, further comprising:
establishing, by the meter interface device, the first communication link with the mobile transceiver of the first network.

4. The method of claim 1, further comprising:
storing, by the meter interface device in response to said successfully establishing the second communication link, preference information indicating that the third party wireless network is a preferred network.

5. The method of claim 1, further comprising:
second transmitting, by the meter interface device while said operating in the simultaneous mode, the first data to the mobile transceiver of the first network and the second data to the third wireless network, wherein the second transmitting further includes a second interleaving of the transmitting of the first data and the second data, wherein the meter interface device is in an initialization state when said attempting to establish the first communication link, and wherein the meter interface device is in the initialization state or a steady-state when said attempting to establish the second communication link.

6. The method of claim 1, wherein the mobile transceiver of the first network is a mobile device operated by a user or a vehicle mounted wireless device, and wherein the second wireless network is one of a Long Range Wide Area Network (WAN), a Low Power WAN, or a Machine Network, and wherein the second wireless network is deployed subsequent to an installation of the meter interface device.

7. The method of claim 1, further comprising:
storing, by the meter interface device, preference information and back-off information, wherein the preference information includes identifiers of second wireless networks configured for access and use by the meter interface device and priorities of access and use of the second wireless networks; and selecting, by the meter interface device, one of the second wireless networks based on the preference information and the back-off information, wherein the one of the second wireless networks is the second wireless network.

8. The method of claim 1, wherein the utility meter includes a water meter.

9. A meter interface device of a utility meter comprising:
a wireless communication interface;
a memory, wherein the memory stores instructions; and
a processor, wherein the processor executes the instructions to:
receive a trigger input;
attempt, in response to the receipt of the trigger input, to establish, via the wireless communication interface, a first communication link with a mobile transceiver of a first network;
attempt, subsequent to the attempt to establish the first communication link, to establish, via the wireless communication interface, a second communication link with a second wireless network, wherein the second wireless network is a third party wireless network;
attach, in response to a successful establishment of the second communication link, to the third party wireless network;
wait, in response to an unsuccessful establishment of the second communication link, a back-off time period before re-attempting to establish the second communication link; and
transmit, via the wireless communication interface while operating in a simultaneous mode, first data to the mobile transceiver of the first network and second data to the second wireless network, wherein the transmitting includes interleaving the transmitting of the first data and the second data.

10. The meter interface device of claim 9, wherein the trigger input includes a swipe of a magnet across a sensor of the meter interface device or a manual input at the meter interface device, and wherein the trigger input causes the meter interface device to at least one of perform a power cycle procedure, a reset procedure, or a reboot procedure.

11. The meter interface device of claim 9, wherein the processor further executes the instructions to:
establish, via the wireless communication interface, the first communication link with the mobile transceiver of the first network.

12. The meter interface device of claim 9, wherein the processor further executes the instructions to:
store, in response to said successfully establishing the second communication link, preference information indicating that the third party wireless network is a preferred network.

13. The meter interface device of claim 9, wherein the meter interface device is in an initialization state when said attempting to establish the first communication link, and wherein the meter interface device is in the initialization state or a steady-state when said attempting to establish the second communication link.

14. The meter interface device of claim 9, wherein the mobile transceiver of the first network is a mobile device operated by a user or a vehicle mounted wireless device, and wherein the second wireless network is one of a Long Range Wide Area Network (WAN), a Low Power WAN, or a Machine Network, and wherein the second wireless network is deployed subsequent to an installation of the meter interface device.

15. The meter interface device of claim 9, wherein the processor further executes the instructions to:

store preference information and back-off information, wherein the preference information includes identifiers of second wireless networks configured for access and use by the meter interface device and priorities of access and use of the second wireless networks; and select one of the second wireless networks based on the preference information and the back-off information, wherein the one of the second wireless networks is the second wireless network.

16. A non-transitory, computer-readable storage medium storing instructions executable by a processor of a meter interface device of a utility meter, which when executed cause the meter interface device to:

receive a trigger input;

attempt, in response to the receipt of the trigger input, to establish, via a wireless communication interface of the meter interface device, a first communication link with a mobile transceiver of a first network;

attempt, subsequent to the attempt to establish the first communication link, to establish, via the wireless communication interface, a second communication link with a second wireless network, wherein the second wireless network is a third party wireless network;

attach, in response to a successful establishment of the second communication link, to the third party wireless network;

wait, in response to an unsuccessful establishment of the second communication link, a back-off time period before re-attempting to establish the second communication link;

transmit, while operating in a simultaneous mode, first data to the mobile transceiver of the first network and second data to the second wireless network, wherein the transmitting includes interleaving the transmitting of the first data and the second data.

17. The non-transitory, computer-readable storage medium of claim 16, wherein the trigger input includes a swipe of a magnet across a sensor of the meter interface device or a manual input at the meter interface device, and wherein the trigger input causes the meter interface device to at least one of perform a power cycle procedure, a reset procedure, or a reboot procedure.

18. The non-transitory, computer-readable storage medium of claim 16, wherein the instructions further comprise instructions, which when executed cause the meter interface device to:

establish the first communication link with the mobile transceiver of the first network.

19. The non-transitory, computer-readable storage medium of claim 16, wherein the instructions further comprise instructions, which when executed cause the meter interface device to:

store, in response to said successfully establishing the second communication link, preference information indicating that the third party wireless network is a preferred network.

20. The non-transitory, computer-readable storage medium of claim 16, wherein the instructions further comprise instructions, which when executed cause the meter interface device to:

store preference information and back-off information, wherein the preference information includes identifiers of second wireless networks configured for access and use by the meter interface device and priorities of access and use of the second wireless networks; and select one of the second wireless networks based on the preference information and the back-off information, wherein the one of the second wireless networks is the second wireless network.

* * * * *